(12) United States Patent
Sakai

(10) Patent No.: US 7,010,787 B2
(45) Date of Patent: Mar. 7, 2006

(54) BRANCH INSTRUCTION CONVERSION TO MULTI-THREADED PARALLEL INSTRUCTIONS

(75) Inventor: Junji Sakai, Tokyo (JP)

(73) Assignee: NEC Corporation, (JP)

( * ) Notice: Subject to any disclaimer, the term of this patent is extended or adjusted under 35 U.S.C. 154(b) by 499 days.

(21) Appl. No.: 09/821,444

(22) Filed: Mar. 29, 2001

(65) Prior Publication Data

US 2004/0103410 A1 May 27, 2004

(30) Foreign Application Priority Data

Mar. 30, 2000 (JP) .............................. 2000-093508

(51) Int. Cl.
*G06F 9/45* (2006.01)
(52) U.S. Cl. ...................................... 717/159; 717/149
(58) Field of Classification Search ................ 717/146, 717/151, 158, 161, 149, 159
See application file for complete search history.

(56) References Cited

U.S. PATENT DOCUMENTS

| 5,437,034 | A | * | 7/1995 | Tanaka et al. ............... 717/160 |
| 5,530,866 | A | * | 6/1996 | Koblenz et al. ............. 717/144 |
| 5,598,561 | A | * | 1/1997 | Funaki ....................... 717/149 |
| 5,812,811 | A | * | 9/1998 | Dubey et al. ................ 712/216 |
| 5,857,104 | A | * | 1/1999 | Natarjan et al. ............. 717/158 |
| 6,292,939 | B1 | * | 9/2001 | Itou et al. ................... 717/149 |
| 6,304,960 | B1 | * | 10/2001 | Yeh et al. .................... 712/236 |
| 6,449,711 | B1 | * | 9/2002 | Week .......................... 712/223 |
| 6,588,009 | B1 | * | 7/2003 | Guffens et al. ............. 717/161 |
| 6,622,301 | B1 | * | 9/2003 | Hirooka et al. ............. 717/149 |
| 6,725,448 | B1 | * | 4/2004 | Moriya et al. ............... 717/119 |

FOREIGN PATENT DOCUMENTS

JP          10-078880          3/1998

OTHER PUBLICATIONS

Akkary, Haitham, Driscoll, Michael A., "A Dynamic Multithreading Processor", 1998 IEEE, p. 226-236, retrieved form IEEE database Apr. 22, 2004.*

Blume, William and Eigenmann, Rudolf, "Performance Analysis of Parallelizing Compilers on the Perfect Benchmarks Programs", 1992 IEEE, p. 643-656, retrieved from IEEE database Apr. 22, 2004.*

Chekuri, C., Johnson, R., Motwani, R., Natarajan, B., Rau, B.R., Schlansker, M., "Profile-Driven Instruction Level Parallel Scheduling with Application to Super Blocks", 1996 IEEE, p. 58-67, retrieved from IEEE database Apr. 22, 2004.*

(Continued)

*Primary Examiner*—Tuan Dam
*Assistant Examiner*—Mary Steelman
(74) *Attorney, Agent, or Firm*—Dickstein, Shapiro, Morin & Oshinsky, LLP.

(57) ABSTRACT

The invention provides a program conversion apparatus which performs parallelization for a multi-thread microprocessor on an intermediate program level. A parallelization apparatus of the program conversion apparatus includes a fork spot determination section, a register allocation section and an instruction reordering section. The fork spot determination section determines a fork spot and a fork system based on a result of a register allocation trial performed by the register allocation section, the number of spots at which memory data dependence is present, and branching probabilities and a data dependence occurrence frequency obtained from a profile information file. The instruction reordering section reorders instructions preceding to and succeeding the FORK instruction in accordance with the determination.

34 Claims, 26 Drawing Sheets

OTHER PUBLICATIONS

McKinley, Kathryn S., "A Compiler Optimization Algorithm for Shared-Memory Multiprocessors", 1998 IEEE, p. 769-787, retrieved from IEEE database Apr. 22, 2004.*

Aho, Alfred V; Sethi, Ravi; Ullman, Jeffrey D; "Compilers Principles, Techniques, and Tools", 1986 Bell Telephone Laboratories, Inc., p. 602-608.*

Torii et al., "Control Parallel On-Chip Multi-processor: MUSCAT," JSPP '97 Joint Symposium on Parallel Processing 1997, the Information Processing Society of Japan, pp. 229-236, May, 1997. (See Discussion in Specification).

Torii et al., "On-Chip Control Parallel Multi-processor: MUSCAT," IPSJ Transaction, vol. 39, No. 6, Jun., 1998. (See Discussion in Specification).

Sakai et al., "Automatic Parallelizing Method for Control-parallel Multi-threaded Architecture," IPSJ Transaction, vol. 40, No. 5, May, 1999. (See Discussion in Specification).

A. V. Aho et al., "Compilers II, Principles, Techniques, and Tools," translated into Japanese by Kenichi Harada, Saiense-Sha, 1990, pp. 734-741. (See Discussion in Specification).

Junji Sakai, et al., "Automatic Parallelizing Method for Control-Parallel Multi-Threaded Architecture," Symposium Series for the Information Processing Society of Japan, Collection of Papers of JSPP '98, Parallel Process Symposium, vol. 98, No. 7, Jun. 1998, pp. 383-390.

Japanese Office Action issued Aug. 24, 2004 (w/ translation of relevant portion).

* cited by examiner

FIG. 7

| SPFORK 1 | TO CREATE A SPECULATION MODE CHILD THREAD FOR STARTING EXECUTION FROM 1 |
|---|---|
| TTERM c | TO END SELF THREAD AND SETTLE CHILD THREAD IF C IS TRUE |
| FTERM c | TO END SELF THREAD AND SETTLE CHILD THREAD IF C IS FALSE |
| THABORT | TO ABANDON A CHILD THREAD OF A SPECULATION MODE |
| BLACK m | TO DESIGNATE A MEMORY ADDRESS DESIGNATED WITH M AS BLOCK |
| RELEASE m | TO CLEAR BLOCK SET TO MEMORY ADDRESS DESIGNATED WITH M |
| DSPIN | TO CREATE A CHILD THREAD CREATED BY SUCCEEDING FORK IN DATA-DEPENDENT SPECULATION MODE |
| DSPOUT | TO CLEAR DATA-DEPENDENT SPECULATION MODE OF CHILD THREAD |
| RDCL t, ... | TO INSTRUCT TO ALLOCATE INTERMEDIATE TERMS/ VARIABLES DESIGNATED WITH t, ⋯ TO REGISTER |
| MDCL t, ... | TO INSTRUCT TO ALLOCATE INTERMEDIATE TERMS/ VARIABLES DESIGNATED WITH t, ⋯ TO MEMORY |

FIG. 8

```
( 1)    t1   := &X            ⎫
( 2)    t2   := I             ⎪
( 3)    t3   := 4             ⎪
( 4)    t4   := t2 * t3       ⎪
( 5)    t5   := t1 + t4       ⎪
( 6)    t6   := 1             ⎬ (B1)
( 7)    mem(t5) := t6         ⎪
( 8)    t7   := I             ⎪
( 9)    t8   := 20            ⎪
(10)    t9   := t7 > t8       ⎪
(11)    if false then goto L2 ⎭
(12)    L1:                   ⎫
(13)    t10  := &X            ⎪
(14)    t11  := J             ⎪
(15)    t12  := 4             ⎪
(16)    t13  := t11 * t12     ⎪
(17)    t14  := t10 + t13     ⎬ (B2)
(18)    t15  := mem(t14)      ⎪
(19)    t16  := J             ⎪
(20)    t17  := t15 + t16     ⎪
(21)    R    := t17           ⎪
(22)    goto L3               ⎭
(23)    L2:                   ⎫
(24)    t18  := K             ⎪
(25)    t19  := 10            ⎪
(26)    t20  := t18 / t19     ⎪
(27)    R    := t20           ⎪
(28)    t21  := &X            ⎪
(29)    t22  := J             ⎪
(30)    t23  := 4             ⎬ (B3)
(31)    t24  := t22 * t23     ⎪
(32)    t25  := t21 + t24     ⎪
(33)    t26  := mem(t25)      ⎪
(34)    t27  := R             ⎪
(35)    t28  := t26 + t27     ⎪
(36)    R    := t28           ⎪
(37)    L3:                   ⎭
```

FIG. 10

```
(101)    t1   := &X
(102)    t2   := I
(103)    t3   := 4
(104)    t4   := t2 * t3
(105)    t5   := t1 + t4
(106)    BLOCK t5
(107)    SPFORK L2
(108)    t6   := 1
(109)    mem(t5) := t6
(110)    RELEASE t5
(111)    t7   := I
(112)    t8   := 20
(113)    t9   := t7 > t8
(114)    FTERM
(115)    THABORT
(116)    goto L1
(117)    L1:
(118)    t10  := &X
(119)    t11  := J
(120)    t12  := 4
(121)    t13  := t11 * t12
(122)    t14  := t10 + t13
(123)    t15  := mem(t14)
(124)    t16  := J
(125)    t17  := t15 + t16
(126)    R    := t17
(127)    goto L3
(128)    L2 :
(129)    t18  := K
(130)    t19  := 10
(131)    t20  := t18 / t19
(132)    R    := t20
(133)    t21  := &X
(134)    t22  := J
(135)    t23  := 4
(136)    t24  := t22 * t23
(137)    t25  := t21 + t24
(138)    t26  := mem(t25)
(139)    t27  := R
(140)    t28  := t26 + t27
(141)    R    := t28
(142)    L3 :
```

(B1) covers lines (101)–(116)
(B2) covers lines (117)–(127)
(B3) covers lines (128)–(141)

FIG. 11

```
(201)   RDCL t1 - t9
(202)   RDCL I
(203)   MDCL X
(204)   t1  := &X
(205)   t2  := I
(206)   t3  := 4
(207)   t4  := t2 * t3
(208)   t5  := t1 + t4
(209)   BLOCK t5
(210)   SPFORK L2
(211)   t6  := 1
(212)   mem(t5) := t6
(213)   RELEASE t5
(214)   t7  := I
(215)   t8  := 20
(216)   t9  := t7 > t8
(217)   FTERM
(218)   THABORT
(219)   goto L1
```
} (B1)

```
(220)   L1:
(221)   RDCL t10 - t17
(222)   RDCL R
(223)   MDCL X , J
(224)   t10 := &X
(225)   t11 := J
(226)   t12 := 4
(227)   t13 := t11 * t12
(228)   t14 := t10 + t13
(229)   t15 := mem(t14)
(230)   t16 := J
(231)   t17 := t15 + t16
(232)   R   := t17
(233)   goto L3
```
} (B2)

```
(234)   L2:
(235)   RDCL t18 - t28
(236)   RDCL R
(237)   MDCL X , J
(238)   t18 := K
(239)   t19 := 10
(240)   t20 := t18 / t19
(241)   R   := t20
(242)   t21 := &X
(243)   t22 := J
(244)   t23 := 4
(245)   t24 := t22 * t23
(246)   t25 := t21 + t24
(247)   t26 := mem(t25)
(248)   t27 := R
(249)   t28 := t26 + t27
(250)   R   := t28
(251)   L3 :
```
} (B3)

FIG. 12

```
(255)    r21 := &X
(256)    r22 := r11
(257)    r23 := 4
(258)    r24 := r22 * r23
(259)    r25 := r21 + r24
(260)    BLOCK r25
(261)    SPFORK L2
(262)    r26 := 1
(263)    mem(r25) := r26
(264)    RELEASE r25
(265)    r27 := r11
(266)    r28 := 20
(267)    r29 := r27 > r28
(268)    FTERM r29
(269)    THABORT
(270)    goto L1
(271)    L1:
(272)    r20 := &X
(273)    r21 := mem(&J)
(274)    r22 := 4
(275)    r23 := r21 * r22
(276)    r24 := r20 + r23
(277)    r25 := mem(r24)
(278)    r26 := mem(&J)
(279)    r27 := r25 + r26
(280)    r12 := r27
(281)    goto L3
(282)    L2:
(283)    r20 := r13
(284)    r21 := 10
(285)    r22 := r20 / r21
(286)    r12 := r22
(287)    r23 := &X
(288)    r24 := mem(&J)
(289)    r25 := 4
(290)    r26 := r24 * r25
(291)    r27 := r23 + r26
(292)    r28 := mem(r27)
(293)    r29 := r12
(294)    r30 := r28 + r29
(295)    r12 := r30
(296)    L3:
```

FIG. 15

```
            t1  := P
            t2  := 0                    ⎫
            t3  := t1 < t2              ⎬ (B11)
            if false goto L2            ⎭
L1:
            t4  := 0                    ⎫ (B12)
            p   := t4                   ⎭
L2:
            t5  := P                    ⎫
            t6  := 15                   ⎬ (B13)
            t7  := t5 > t6              ⎪
            if false goto L4            ⎭
L3:
            t8  := 0                    ⎫ (B14)
            p   := t8                   ⎭
L4:
            t9  := 1                    ⎫
            t10 := P                    ⎪
            t11 := t9 << t10            ⎪
            J   := t11                  ⎪
            t12 := Z                    ⎪
            mem (t12) := t11            ⎪
            t13 := &X                   ⎪
            t14 := P                    ⎪
            t15 := 4                    ⎪
            t16 := t14 * t15            ⎪
            t17 := t13 + t16            ⎪
            t18 := mem(t17)             ⎪
            t19 := J                    ⎪
            t20 := t18 + t19            ⎬ (B15)
            mem(t17) := t20             ⎪
            K   := t20                  ⎪
            t21 := &X                   ⎪
            t22 := P                    ⎪
            t23 := 4                    ⎪
            t24 := t22 * t23            ⎪
            t25 := t21 + t24            ⎪
            t26 := mem(t25)             ⎪
            t27 := 9                    ⎪
            t28 := t26 > t27            ⎪
            if false goto L6            ⎭
L5:
            t29 := &X                   ⎫
            t30 := P                    ⎪
            t31 := 4                    ⎪
            t32 := t30 * t31            ⎬ (B16)
            t33 := t29 + t32            ⎪
            t34 := mem(t33)             ⎪
            t35 := 1                    ⎪
            t36 := t34 - t35            ⎪
            mem(t33) := t36             ⎭
L6:
            t37 := &Y                   ⎫
            t38 := P                    ⎪
            t39 := 4                    ⎪
            t40 := t38 * t39            ⎬ (B17)
            t41 := t37 + t40            ⎪
            t42 := mem(t41)             ⎪
            t43 := K                    ⎪
            t44 := t42 + t43            ⎪
            J   := t44                  ⎭
```

FIG. 16(A)

BRANCHING NUMBER

| B I1 | B I2: 2D | B I3: 18D |
|---|---|---|
| B I3 | B I4: 3D | B I5: 17D |
| B I5 | B I6: 3D | B I7: 17D |

FIG. 16(B)

MEMORY DATA DEPENDENCE

| B I5 → B I6 | 12D |
|---|---|
| B I5 → B I7 | 4 |

FIG. 17

```
         RDCL t1 - t3                    t18  := mem(t17)
         SPFORK L2                       t19  := J
         t1 := P                         t20  := t18 + t19
         t1 := 0              (B11)      mem(t17) := t20
         t3 := t1 < t2                   K    := t20
         FTERM t3                        DSPOUT
         THABORT                         t21  := &X
         goto L1                         t22  := P                    (B15)
L1:                                      t23  := 4
         RDCL t4  P                      t24  := t22 * t23
         t4 := 0              (B12)      t25  := t21 + t24
         P  := t4                        t26  := mem(t25)
L2:                                      t27  := 8
         RDCL t5 - t7                    t28  := t26 > t27
         SPFORK L4                       FTERM t29
         t5 := P                         goto L5
         t6 := 15             (B13) L5:
         t7 := t5 > t6                   RDCL t29 - t36  P
         FTERM t7                        MDCL X
         THABORT                         t29  := &X
         goto L3                         t30  := P
L3:                                      t31  := 4
         RDCL t9 , P                     t32  := t30 * t31           (B16)
         t8 := 0              (B14)      t33  := t29 + t32
         P  := t8                        t34  := mem(t33)
L4:                                      t35  := 1
         RDCL t9 - t28 , J , P           t36  := t34 - t35
         MDCL K , X , Z                  mem(t33) := t36
         t9 := 1                    L6:
         t10 := P                        RDCL t37 - t47  J , P
         t11 := t9 << t10                MDCL K , Y , Z
         J   := t11                      t37  := &Y
         DSPIN                           t38  := P
         SPFORK L6            (B15)      t39  := 4
         t12 := &Z                       t40  := t38 * t39
         mem(t12) := t11                 t41  := t37 + t40           (B17)
         t13 := &X                       t42  := mem(t41)
         t14 := P                        t43  := K
         t16 := t14 * t15                t44  := t42 + t43
         t17 := t13 + t16                t45  := &Z
                                         t46  := mem(t45)
                                         t47  := t44 + t46
                                         J    := t47
```

PRIOR ART

PRIOR ART

PRIOR ART

PRIOR ART

BRANCH INSTRUCTION CONVERSION TO MULTI-THREADED PARALLEL INSTRUCTIONS

BACKGROUND OF THE INVENTION

1. Field of the Invention

The present invention relates to a program conversion apparatus and method for a multi-thread type microprocessor which can execute a plurality machine instructions simultaneously, and more particularly to a program conversion apparatus and method for producing a parallel program which exhibits a high execution efficiency although the granularity is low.

2. Description of the Related Art

A multi-thread execution technique wherein a program is divided into a plurality of instruction flows, that is, threads and executing the threads parallelly is conventionally adopted as one of techniques for raising the execution performance of a program by an information processing apparatus.

A multi-thread microprocessor including a plurality of processor elements each having an execution unit and coupled closely to each other has a characteristic that processing such as creation and synchronization of threads can be performed at a low cost, and can exhibit a sufficient parallel processing effect even with a program which is high in sequential property and low in granularity (size of a thread).

Various architectures for such a multi-thread micropro-cessor as described above are known and disclosed, for example, in the following documents:

Document 1: Torii et al., "Control Parallel On-Chip Multi-processor: MUSCAT", JSPP' 97 Joint Symposium on Parallel Processing 1997, the Information Processing Society on Japan, pp.229–236, May, 1997

Document 2: Torii et all, "On-chip Control Parallel Multi-processor: MUSCAT", *IPSJ TRANSACTION*, Vol. 39, No. 6, June, 1998

Document 3: Japanese Patent Laid-Open No. 78880/1998

First, the MUSCAT architecture disclosed in Document 2 above is described. The MUSCAT is an architecture wherein a plurality of processor elements are integrated on one chip and efficiently execute multi-thread processing called "control parallel". Each processor element has an independent functional unit and an independent register set. On the other hand, the processor elements share a memory space.

A control parallel execution method of the MUSCAT is described. Each processor element of the MUSCAT architecture has a FORK instruction for generation of a thread and can create a new thread in an adjacent processor element using one machine instruction.

The MUSCAT adopts a "fork once model" for limiting the number of times by which one thread can execute the FORK instruction to one to the utmost. The processor elements are coupled in a one-directional ring, and if a thread being executed by a certain one of the processor elements executes the FORK instruction, then a new thread is created in another processor element adjacent on the downstream side. If the thread executes a term instruction (thread ending instruction), then the thread ends itself.

Transfer of data between processor elements is performed through a register or a memory. If the FORK instruction is executed, then contents of the register set of the processor element by which the thread (called "parent thread") is being executed are logically copied into the register set of another processor element which is to execute the newly generated thread (called "child thread"). Further, a value stored into a memory by the parent thread before the FORK instruction is executed can be loaded into and referred to by the child thread.

The only method by which the parent thread delivers data to the child thread after the parent thread generates the child thread is to deliver data through a memory. In this instance, in order to execute store of the parent thread and load of the child thread in a correct execution order, they must be in a kind of synchronism with each other. A countermeasure for such synchronization is called "data dependence assurance".

The MUSCAT provides the following two systems for the data dependence assurance:

1. BLOCK system wherein synchronism is explicitly declared in advance; and

2. DSP system wherein the data dependence assurance is executed without synchronization, and, when it is found that the data is not transferred correctly, it is re-started.

FIG. 19 illustrates operation of the BLOCK system. The data dependence assurance system according to the BLOCK system uses a BLOCK instruction and a RELEASE instruction provided by the MUSCAT.

The parent thread first designates a store object memory address with the BLOCK instruction and then executes the FORK instruction to perform memory store. Thereafter, the parent thread executes the RELEASE instruction to indicate that data is prepared at the memory address. If the child thread tries to execute load from the address blocked by the parent thread, then the LOAD instruction is not completed until the parent thread executes the RELEASE instruction. In this manner, a value having been written into the memory by the parent thread (a value stored in the memory) can be read out (loaded from the memory) correctly by the child thread. The DSP system which is the other data dependence assurance system is one of speculation execution systems and is hereinafter described in detail.

Now, a speculation execution function of a MUSCAT architecture is described with reference to FIGS. 20(A) and 20(B). The SPFORK instruction of the MUSCAT is a kind of FORK instruction and indicates creation of a thread of a control speculation mode. A child thread created using the SPFORK instruction is executed in a state wherein the execution thereof can be cancelled any time. In other words, although change of register values is permitted, accessing to an external memory is deferred.

If the parent thread executes a THFIX instruction (thread settlement instruction) as seen in FIG. 20(A), then the control speculation mode of the child thread is cleared, and memory changing operations accumulated in the inside of the child thread are actually reflected on its memory.

However, if the parent thread execute a THABORT instruction (thread abandon instruction) as seen in FIG. 20(B), then the child thread is abandoned, and all changes which have been tried to perform for the register set or the memory are abandoned. It is to be noted that, if the parent thread is ended by the TERM instruction before the parent thread executes the THFIX instruction or the THABORT instruction, then the control speculation mode of the child instruction is cleared.

A thread of the control speculation mode is used in such a case that, although there is the high possibility that it may be executed eventually, it cannot be determined at the earlier stage of the execution whether or not it should be executed. In other words, a control speculation mode thread is created and used for parallel processing at an early stage in the program, and it is discriminated whether or not processing by a thread generated later should be performed actually to settle or abandon the thread.

The control speculation mode fork described above predicts a flow of control and creates a thread speculatively. However, a function of predicting data dependence and executing a thread speculatively is prepared by the MUSCAT independently of the control speculation mode form. Such a thread state as just described is called "data-dependent speculation mode".

Where the data-dependent speculation mode is used, the parent thread need not use the BLOCK instruction or the RELEASE instruction. The hardware architecture inspects memory data dependence between the parent and the child (the order in time between the store of the parent thread into the memory and the load of the child thread from the memory) upon execution, and if the child thread loads a wrong value, then the hardware architecture causes the child thread to execute the load again.

The DSP method which is the other data dependence assurance system than the BLOCK system described above utilizes the data-dependent speculation mode.

Referring to FIG. 21, the parent thread performs the fork after it executes a DSPIN instruction which signifies to fork in the data-dependent speculation mode. A child thread generated by this starts execution in the data-dependent speculation mode. Then, if the parent thread executes a DSPOUT instruction, then the child thread returns the non-data-dependent speculation mode from the data-dependent speculation mode.

The data-dependent speculation mode does not require the BLOCK/RELEASE instructions and is advantageous in that the fork can be performed even if a memory address which causes data dependence is not known in advance. However, it has a drawback in that, if data dependence occurs after the fork, then the child thread re-starts its execution of a portion which is based on wrong data.

Accordingly, an appropriate one of the BLOCK system and the DSP system should be selected depending upon the situation of data dependence involved in the program.

Through the use of the FORK instruction and the control parallel supporting instructions of the data dependence assurance system and so forth, the MUSCAT architecture can extract a comparatively great number of parallelly executable portions from a program and thereby improve the execution performance of the program.

A program for such a MUSCAT architecture as described above must be coded using the instructions described above for each spot for which the fork is performed. Therefore, a compiler which automatically produces a machine instruction sequence from a high level language (high level programming language) is demanded more strongly than a conventional type of architecture.

A compiler technique for a MUSCAT architecture is disclosed in Sakai et al., "Automatic Parallelizing Method for Control-parallel Multi-threaded Architecture", *IPSJ TRANSACTION*, Vol. 40, No. 5, May, 1999, which is hereinafter referred to as Document 4. An outline of the technique disclosed in Document 4 is described below.

Document 4 discloser a mechanism of a translator for converting a machine instruction sequence produced by an ordinary sequential compiler into an instruction sequence for the MUSCAT. A control flow analysis and a data flow analysis are performed for a given machine instruction sequence, and parallelization is attempted using the FORK instruction for each basic block. Here, the "basic block" is a series of instructions which does not include intermediate branch or confluence of control.

Parallelization for each basic block begins with replacement of a branching instruction positioned at the tail end of the basic block with the control speculation mode FORK instruction (SPFORK instruction). This signifies to try to execute one of a plurality of basic blocks succeeding a certain basic block in parallel to the certain basic block. As regards which one of succeeding basic blocks should be selected, Document 4 recites that, where a loop structure is employed, that the basic block that is followed by a loop back edge (the returning direction of the loop) should be selected. Document 4 further discloses to use profile information to select one of the succeeding basic blocks which exhibits a high branch probability.

Thereafter, data dependence by accessing to a register and a memory between the basic block and a fork destination basic block and basic blocks succeeding the fork destination basic block is investigated.

Then, the instructions in the basic block are reordered so that the FORK instruction may be positioned on the upstream side as far as possible in the basic block. Such reordering of the instructions is performed taking the data dependence relationship into consideration, and if true dependence exists through a register, then the instruction is arranged on the upstream side with respect to the FORK instruction. Meanwhile, if positive dependence exists through a memory, then the DSPIN instruction or the BLOCK instruction whose argument is a dependent memory address is inserted to the position immediately prior to the FORK instruction.

As regards selective use of the DSPIN instruction and the BLOCK instruction, Document 4 recites that, when the memory address which causes dependence cannot be determined till immediately before the store and when, even if the memory address which causes dependence is determined successfully, the number of memory addresses that cause dependence is greater than a certain number, the DSPIN instruction should be used, but in any other case, the BLOCK instruction should be used. It is to be noted that, although Document 4 further discloses an instruction production procedure unique to the MUSCAT, since the direct relevancy of this to the subject matter of the present invention is poor, the instruction production procedure is not described herein.

The prior art described above has the following problems.

First, there is room for augmentation in the criteria for selection of the fork destination.

According to the prior art described above, statically a loop structure is grasped and dynamically profile information of an execution history is obtained, and the fork destination is determined based on the loop structure and the profile information. However, they merely fork a portion which is executed in a comparatively high probability on a flow of control, but no data dependence is taken in to consideration. Therefore, even if it is tried to execute a portion at which excessive data dependence is present by multi-threads, the parallel execution portion becomes short or waiting occurs at the data-dependent spot. As a result, there is a problem that only a little improvement in performance can be achieved.

The second problem resides in that the data dependence dealing procedure is different between the register and the memory.

According to the procedure disclosed in Document 4 and so forth, reordering of instructions and processing of a new insertion instruction are different between dependence through a register and dependence through a memory. However, in the inside of a compiler, an expression which uses a virtual variable called "intermediate term" is commonly used, and it is difficult to perform parallelization processing based on a discrimination between a register and a memory at this stage.

On the other hand, even in a general compiler, as the last stage is approached, register allocation is completed and distinction between a register and a memory is settled. However, if it is tried to perform parallelization in this stage, then it is difficult to perform processing of changing the program structure so that a bad influence may not be had on a control flow or a data flow optimized already.

SUMMARY OF THE INVENTION

It is an object of the present invention to provide a program conversion apparatus and method and a recording medium suitable for a multi-thread microprocessor by which it is made possible to perform parallelization processing based on a precise judgment at an intermediate term level in the inside of a compiler.

It is another object of the present invention to provide a program conversion apparatus and method and a recording medium by which an object code which can extract a higher parallel performance upon parallel execution can be generated.

In order to attain the objects described above, according to an aspect of the present invention, there is provided a program conversion apparatus for converting a given source program into a program for a multi-thread processor including a plurality of program counters and a plurality of thread execution apparatus, comprising a register allocation trial section for trying register allocation prior to parallelization to estimate a register allocation situation of variables and intermediate terms of an intermediate program, a fork spot determination section for determining based on a result of the register allocation trial by the register allocation trial section whether or not a conditional branch portion of the intermediate program should be converted into a parallel code for which a thread creation instruction is used and determining a parallelization execution method with the parallel code, an instruction reordering section for converting the conditional branch portion in the intermediate program into a parallel code for which the thread creation instruction is used based on a result of the determination by the fork spot determination section and referring to the result of the register allocation trial to insert an instruction for assuring a data-dependence relationship between threads through a memory into positions before and after the thread creation instruction and reorder the instructions before and after the thread creation instruction so that thread creation may be performed in an early stage, and a register allocation section for performing definite register allocation so that, regarding whether or not a physical register is allocated to the parallelized and reordered instruction sequence, the same allocation result as that upon the register allocation trial may be obtained.

According to another aspect of the present invention, there is provided a program conversion apparatus, comprising a syntax analysis section for analyzing the syntax of a source program to produce an intermediate program, a parallelization section for performing optimization processing including parallelization for the intermediate program, and a code generation section for producing a target program including an instruction code for a target processor apparatus from the intermediate program optimized by the parallelization section, the parallelization section including an intermediate program inputting section for reading in the intermediate program and analyzing a control flow and a data flow, a register allocation section for trying to perform register allocation prior to parallelization to estimate a register allocation situation of variables and intermediate terms or the intermediate program and executing allocation of registers, a fork spot determination section for determining, based on a result of the trial of the register allocation, a spot of a conditional branch portion of the intermediate program to be converted into a parallel code for which a thread creation instruction is used, an instruction reordering section for performing reordering of instructions before and after the parallelization spot from information of the parallelization spot determined by the fork spot determination section, the data flow and so forth, and an intermediate program outputting section for outputting the instruction sequence for which the conversion including the parallelization has been completed in a format of the intermediate program again.

Preferably, the target processor apparatus is a multi-thread processor which includes a plurality of program counters and a plurality of thread execution apparatus, the plurality of thread execution apparatus being operable to fetch, decode and execute a plurality of instructions of threads simultaneously in accordance with the plurality of program counters such that it is possible to execute, after a thread is created, the thread in a control speculative mode wherein a change having had an effect on a register set can be canceled later and to execute the thread in a data-dependence speculative mode wherein, when, after a self thread loads a value from a memory location, a parent thread by which the self thread has been created stores a value into the same memory location, at least a processing result of the self thread after the load is abandoned and the processing is re-executed, the multi-thread processor having an instruction set with which it can be executed by a single machine instruction or a combination of several machine instructions for a thread being executed by any of the thread execution apparatus to create a new thread of the control speculative mode, to end, if a designated condition is satisfied, the self thread and clear the control speculative mode of a thread of the control speculative mode created by the self thread, to abandon the created thread of the control speculative mode, to give, when a thread created by the self thread performs load from a memory location of a designated address, an instruction in advance to temporarily block the operation, to clear the load temporary blocking instruction to the designated memory address, for the thread being executed by the thread execution apparatus to create a new thread of the data-dependent speculative mode and to clear the data-dependent speculative mode of the thread of the data-dependent speculative mode created by the self thread.

According to a further aspect of the present invention, there is provided a program conversion method for performing an optimization process including parallelization for an intermediate program outputted as a result of a syntax analysis on a program conversion apparatus which compiles a source program and outputs a target program for a target processing apparatus of the multi-thread type, comprising a register allocation trial step of trying register allocation prior to parallelization to estimate a register allocation situation of variables and intermediate terms of the intermediate program, a fork spot determination step of determining based on a result of the register allocation trial whether or not a conditional branch portion of the intermediate program should be converted into a parallel code for which a thread creation instruction is used or performing determination of whether or not the conditional branch portion should be converted into a parallel code and, when such conversion should be performed, determination of a parallelization execution method, an instruction reordering step of converting the conditional branch portion in the intermediate program into a parallel code for which the thread creation instruction is used based on a result of the determination by the fork spot determination step and referring to the result of the register allocation trial to insert an instruction for assuring a data-dependence relationship between threads through a memory into positions before and after the thread creation instruction and reorder the instructions before and after the thread creation instruction so that thread creation may be performed in an early stage, and a register allocation step of performing definite register allocation so that the same allocation result as that upon the register allocation trial may be obtained for the parallelized and reordered instruction sequence.

With the program conversion apparatus and method, the following advantages can be anticipated.

First, parallelization which uses the FORK instruction on the intermediate program level can be performed precisely.

The reason is that, although the register allocation section is positioned in a stage later than parallelization, since register allocation is tried by the parallelization process, it can be estimated whether each intermediate term is to be placed into a register or stored into a memory location.

Second, the performance when the FORK instruction is used to execute parallelization is improved.

It is one reason that the fork spot determination section statically investigates the situation of data dependence between parent and child threads and selects the fork destination so that the possibility of temporary blocking of execution of the child thread caused by data dependence may be lowered. It is another reason that the fork spot determination section investigates a static data dependence occurrence situation based on file information and selects the fork destination so that the possibility of temporary blocking of execution of the child thread or re-execution of the child thread caused by data dependence may be lowered.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 7 is a table illustrating control parallel correlation instructions in an intermediate program in the first embodiment;

FIG. 8 is a view illustrating an intermediate program before parallelization in the first embodiment;

FIGS. 9 and 10 are similar views but illustrating the intermediate program during reordering of instructions in the first embodiment;

FIG. 11 is a similar view but illustrating the intermediate program upon ending of reordering of instructions in the first embodiment;

FIG. 12 is a similar view but illustrating the intermediate program upon ending of register allocation in the first embodiment;

FIG. 15 is a view illustrating an intermediate program before parallelization in the second embodiment;

FIGS. 16(A) and 16(B) are tables illustrating profile information in the second embodiment;

FIG. 17 is a view illustrating the intermediate program upon ending of reordering of instructions in the second embodiment;

DESCRIPTION OF THE PREFERRED EMBODIMENTS

Embodiment 1

Figure 1:
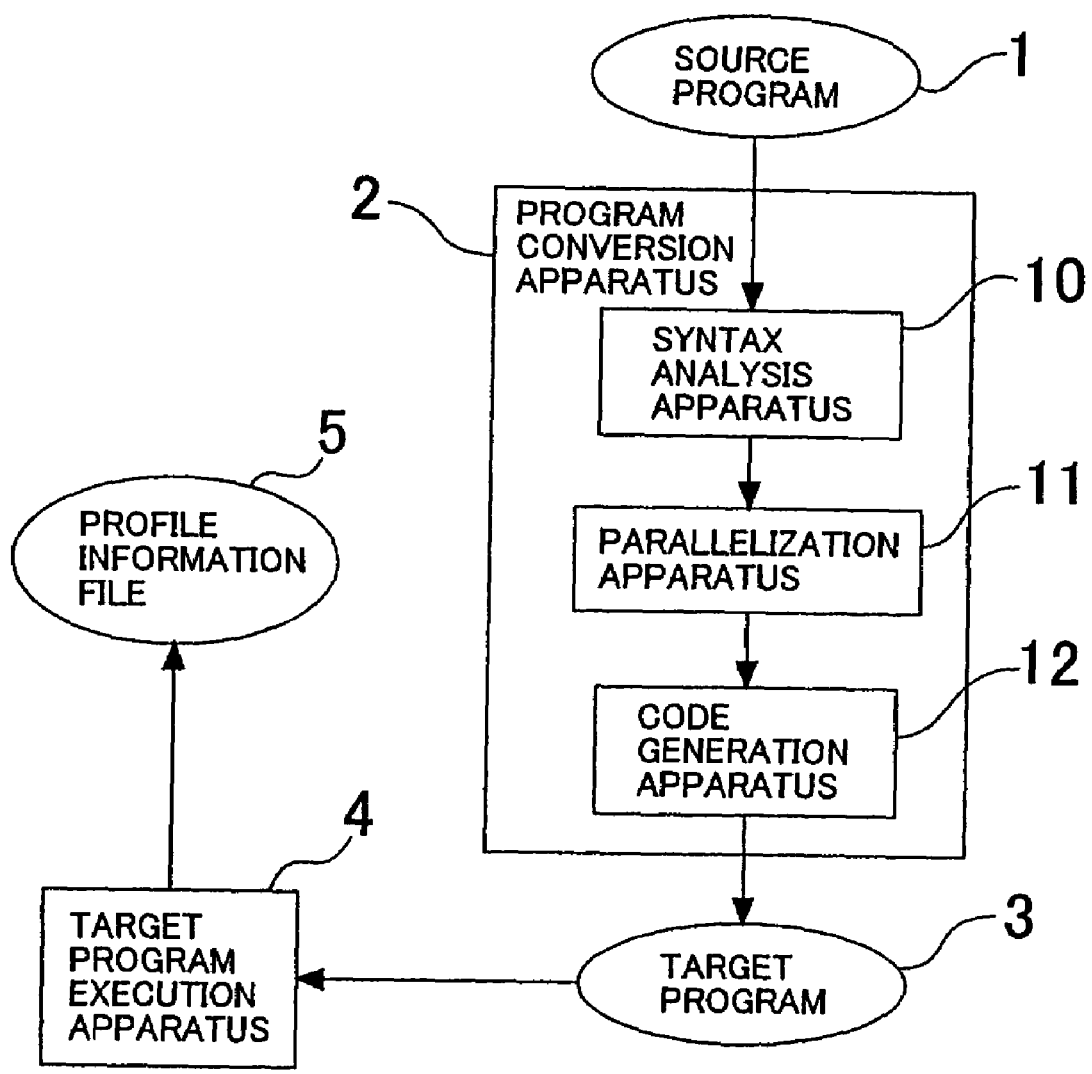
FIG. 1 is a flow diagram showing a general construction of a program conversion apparatus according to a first embodiment of the present invention.

Referring to FIG. 1, there is shown an example of configuration of a program conversion apparatus or compiler to which the present invention is applied. The program conversion apparatus 2 reads in a source program 1, performs a compiling process including parallelization for the source program 1 and outputs a target program 3 obtained by the compiling process.

A target program execution apparatus 4 receives the target program 3 and executes instructions of a target architecture. Further, the target program execution apparatus 4 collects execution information of the target program 3 and outputs a profile information file 5.

The program conversion apparatus 2 includes a syntax analysis apparatus 10 for decoding and analyzing the syntax of the source program 1 inputted thereto to produce an intermediate program, a parallelization apparatus 11 for performing an optimization process including parallelization for the intermediate program received from the syntax analysis apparatus 10, and a code generation apparatus 12 for producing an instruction sequence for a target architecture from the optimized intermediate program received from the parallelization apparatus 11.

The parallelization apparatus 11 can receive the profile information file 5 as auxiliary information to perform optimization processing of a higher level.

The syntax analysis apparatus 10 may have a known configuration and may naturally be composed of, for example, a lexical analysis section, a syntax analysis (purging) section and a semantic analysis section. Also the code generation apparatus 12 for producing an instruction sequence for a target architecture from an optimized intermediate program may have a known configuration.

Figure 2:
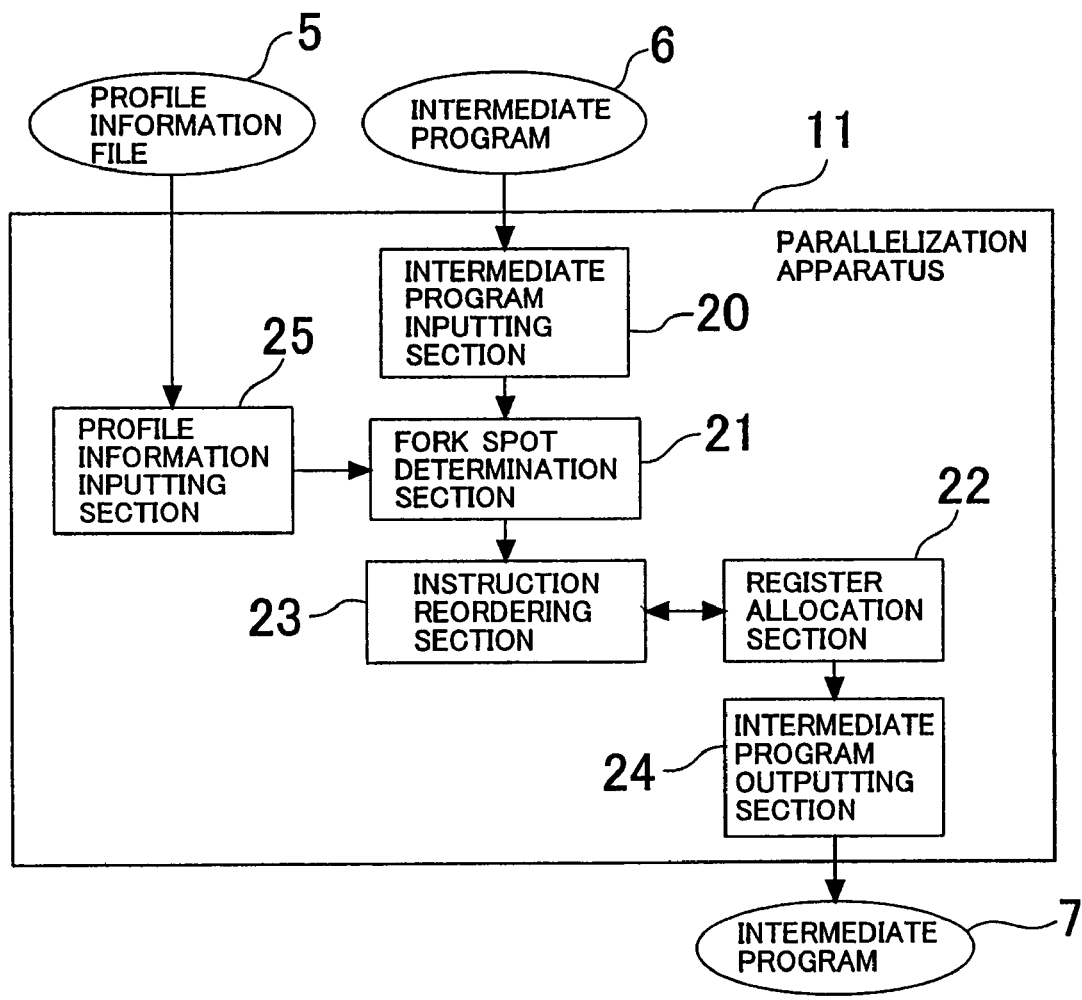
FIG. 2 is a flow diagram showing an internal construction of the program conversion apparatus.

FIG. 2 shows a configuration of the parallelization apparatus 11 of the program conversion apparatus 2. The parallelization apparatus 11 which is an essential component of the program conversion apparatus 2 according to the present invention is described in detail below with reference to FIGS. 1 and 2.

The parallelization apparatus 11 receives an intermediate program 6 produced by the syntax analysis apparatus 10, performs an optimization process including parallelization for the intermediate program 6 and delivers another intermediate program 7 to the code generation apparatus 12 in the following stage.

The parallelization apparatus 11 includes an intermediate program inputting section 20 for reading in the intermediate program 6 inputted to the parallelization apparatus 11 and analyzing a control flow and a data flow of the intermediate program 6, a fork spot determination section 21 for determining, based on the control flow, data flow and profile information, a spot of the intermediate program 6 to be parallelized, a register allocation section 22 for trying register allocation to an intermediate term on the intermediate program 6 or executing such register allocation, an instruction reordering section 23 for performing reordering of instructions before and after the parallelization spot from the determined parallelization spot and the information of the data flow and so forth, an intermediate program outputting section 24 for outputting the instruction sequence for which the conversion including the parallelization has been completed in a format of the intermediate program again, and a profile information inputting section 25 for receiving the profile information file 5 obtained by execution of a target program once and converting the profile information file 5 into a file of an internal format.

Now, parallelization operation of the program conversion apparatus 2 according to the embodiment of the present invention is described in detail with reference to flow charts of FIGS. 3, 4 and 5.

In the embodiment of the present invention, the following instructions relating to control parallelization can be described on an intermediate program.

(1) Control Speculation FORK Instruction:

The control speculation FORK instruction is used to create a child thread of the control speculation mode which starts execution from an instruction designated by the operand while the self thread continues execution of succeeding instructions.

(2) Thread End Instruction:

The thread end instruction is used to end the self thread and place the child thread into the settlement mode.

(3) Child Thread Abandon Instruction:

The child thread abandon instruction is used to abandon the child thread of the control speculation mode.

(4) BLOCK Setting Instruction:

The BLOCK setting instruction is used to instruct the processor to set a block to a memory address designated by the operand and temporarily stop (block) execution of the child thread when the child thread tries to execute load from the memory address.

(5) BLOCK Clear Instruction:

The BLOCK clear instruction is used to instruct the processor to clear the block set to the memory address designated by the operand and resume execution of the child thread temporarily stopped (blocked) in the load from the memory address.

(6) Register Allocation Indication Instruction:

The register allocation indication instruction is used to instruct the register allocation section to allocate a physical register to an intermediate term or a variable designated by the operand or conversely to allocate an area of the memory to an intermediate term or a variable designated by the operand.

Figure 3:
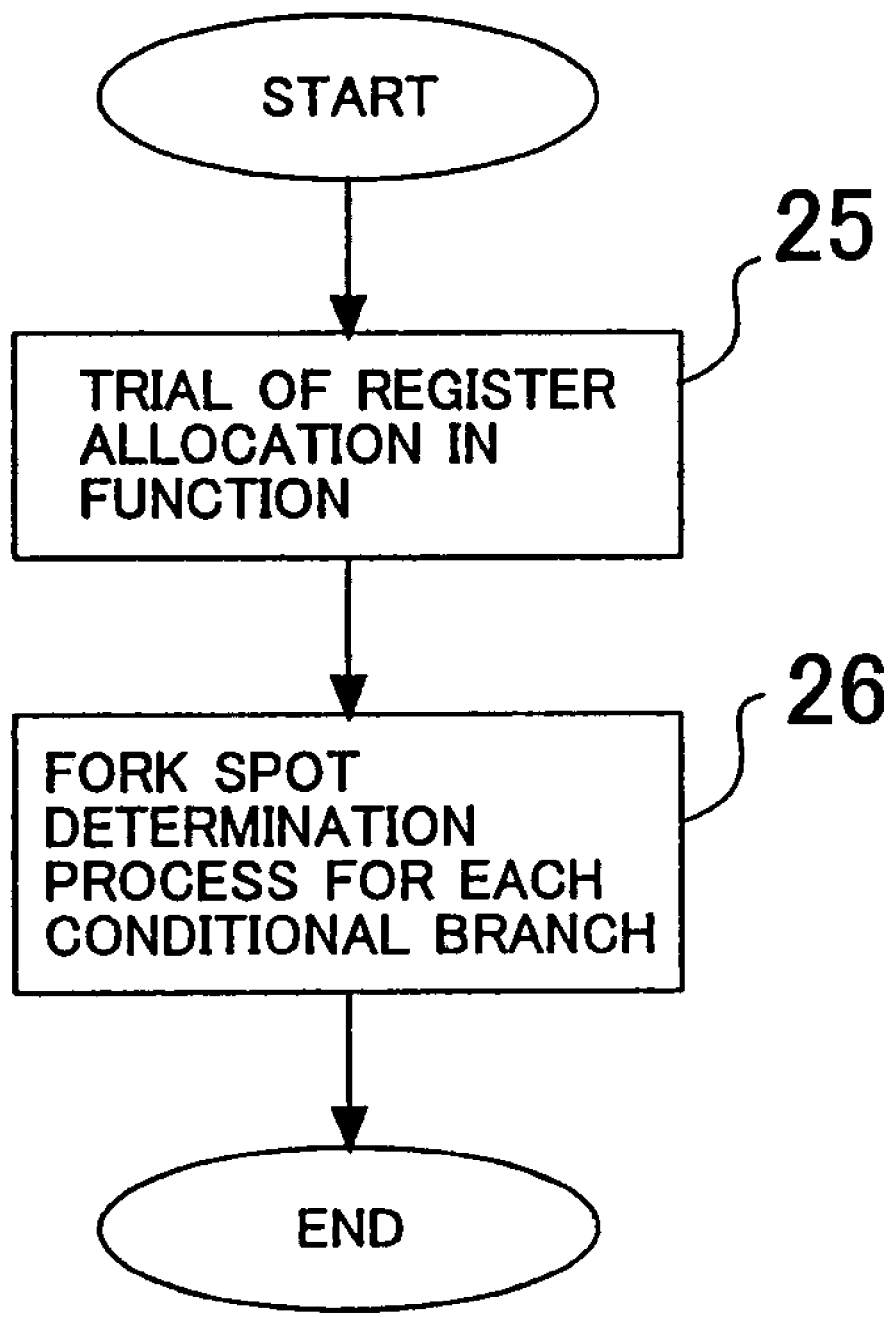
FIG. 3 is a flow chart illustrating operation of a fork spot determination section in the first embodiment.

FIG. 3 illustrates an outline of operation of the fork spot determination section 21 in the program conversion apparatus 2 of the embodiment of the present invention. The fork spot determination section 21 performs the operation illustrated in FIG. 3 in a unit of a function in a given intermediate program. In particulars register allocation is tried in the function in step 25, and then a fork spot determination process is performed for each conditional branching instruction included in the function in step 26.

In the stage of step 26, various optimization processes including parallelization are not completed as yet, and a definite register allocation process should not be performed as yet. Therefore, registration allocation is executed partly, and in a stage wherein information of to which intermediate terms/variables in the intermediate program a register is allocated and which intermediate terms/variables are arranged on a memory is obtained, the register allocation process is stopped without actually performing the allocation.

Trial of the register allocation is performed by the register allocation section 22 (refer to FIG. 2) as hereinafter described. The register allocation section 22 includes a mechanism for ending its process in a stage wherein it is determined which registers are allocated to the individual intermediate terms/variables and returning only the register allocation situation without replacing the intermediate terms/variables into the actual registers.

Figure 4:
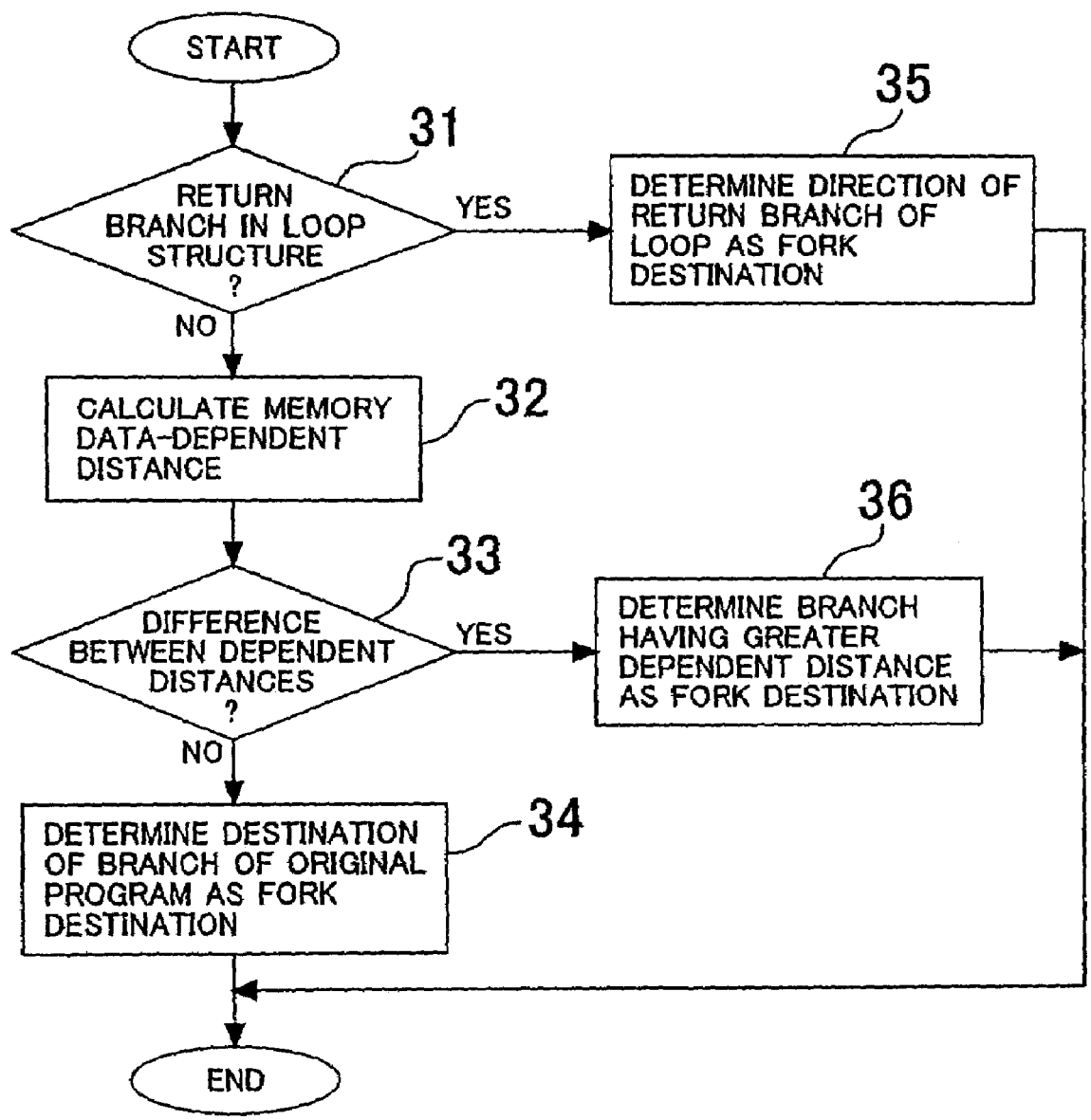
FIG. 4 is a flow chart illustrating different operation of the fork spot determination section in the first embodiment.

FIG. 4 illustrates details of the process (step 26 of FIG. 3) of the fork spot determination section 21 for each conditional branching instruction.

Referring to FIG. 4, in step 31, the fork spot determination section 21 discriminates whether or not the conditional branching instruction corresponds to a return branch of a loop structure (repeat structure) in the inputted intermediate program. For the method of detecting a loop structure, refer to, for example, the description in A. V. Aho et al., "Compilers II, Principles, Techniques, and Tools", translated into Japanese by Konichi Harada, SAIENSU-SHA, 1990, pp. 734–737, which is hereinafter referred to as Document 5.

If it is discriminated in step 31 that the conditional branching instruction corresponds to a loop return branch, then the direction of the return branch, that is, the loop continuing direction, is determined as the fork destination and the conditional branch spot is selected as the for spot. The reason is that, generally since a loop structure is inclined to be executed repetitively by a plural number of times, the processing at the branching instruction corresponding to the loop return branch branches to the return branch spot with a high possibility.

If the conditional branching instruction does not correspond to a return branch in step 31, then the fork spot determination section 21 calculates a minimum value of the distance of data dependence for each of the two branching destinations of the conditional branch in step 32.

Here, the "distance of data dependence" is a representation by the number of steps in the intermediate program of the position of the memory reference instruction from the top of a branching destination basic block for each of these intermediate terms/variables estimated to be arranged on the memory in step 26 from among the intermediate terms/ variables which are defined in a basic block being the processing object at present and may possibly be referred to by the branching destination.

In step 32, a minimum value of the distance of data dependence of the intermediate terms/variables is calculated for the two branching destinations.

In next stop 33, the two minimum values of the distance of data dependence determined regarding the opposite sides of the conditional branch in step 32 is compared with each other to discriminate whether or not they have a difference equal to or greater than a fixed value.

If the two minimum values have a difference equal to or greater than the fixed value, then at step 36 the branching direction of the branch which exhibits a higher minimum value of the distance of data dependence is determined as the fork destination and the conditional branch spot is selected as the fork spot. The reason is that the possibility that, where the branching direction selected here is forked as the new thread, the possibility that the processing may be stopped by data dependence immediately next to the fork is lower than that where the other is forked.

When the distance of data dependence is determined in step 32, not the simple instruction step number but the cycle number (clock cycles or the like) estimated to be required when the instructions are executed on the processor of the target architecture. This makes more precise the selection in step 33 described above that the branch with which data dependence occurs at a later timing is selected.

In step 34, when the minimum values of the distance of data dependency do not have a difference equal to or greater than the fixed amount in the immediately preceding step, the branch which has been the branching destination in the original intermediate program (the taken side of the branching instruction (branch satisfaction side)) is determined as the for destination and the conditional branch spot is selected as a fork candidate. The selection of the for destination is based on the same reason as that recited in the documents mentioned hereinabove as prior art documents.

The fork spot determination section 21 determines the fork spot and the fork destination in such a manner as described above.

In the embodiment of the present invention described above, the process of the fork spot determination section 21 described in detail above with reference to FIG. 4 makes it possible to refer to register allocation information to perform a parallelization process on an intermediate program without waiting a register allocation process which normally is performed in the last stage of optimization.

In the embodiment of the present invention, since the processing in steps 32 and 33 of FIG. 4 is provided, the possibility of improvement of the performance at the other portions than the loop structure is raised.

Figure 5:
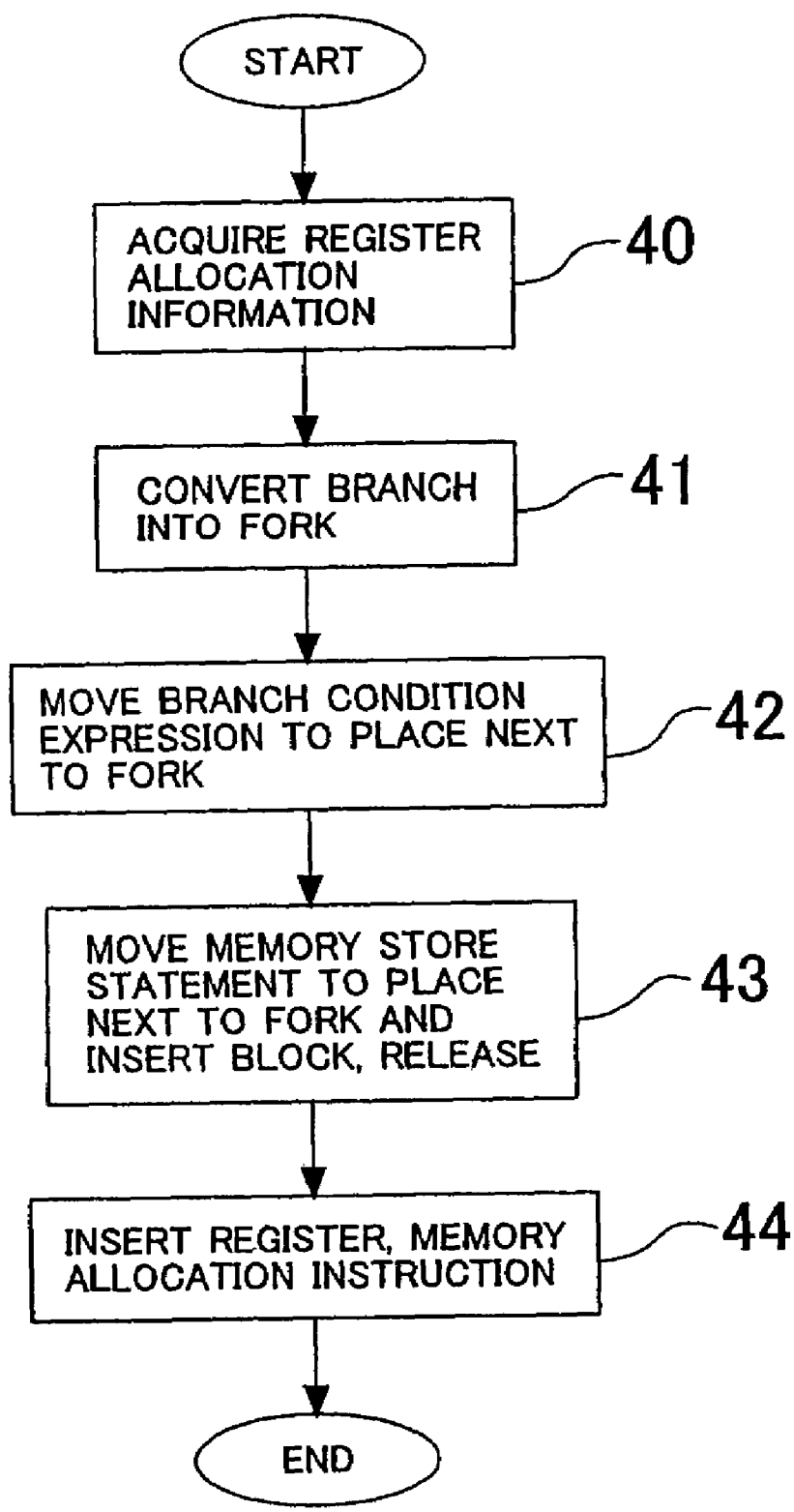
FIG. 5 is a flow chart illustrating operation of an instruction reordering section in the first embodiment.

FIG. 5 illustrates operation of the instruction reordering section 23 of the parallelization apparatus 11 of the program conversion apparatus 2 according to the embodiment of the present invention. FIGS. 6(A) to 6(E) supplementarily illustrate an instruction reordering process of the instruction reordering section 23. In the following, operation of the instruction reordering section 23 is described with reference to FIGS. 5 and 6(A) to 6(E).

Referring first to FIG. 5, the instruction reordering section 23 performs a series of processes from step 40 to step 44 for each basic block which includes a fork spot determined by the fork spot determination section 21. It is to be noted that the processes in steps 40 to 44 are all performed for an intermediate program. Instructions appearing in the description of the steps all denote corresponding instructions on the intermediate program.

Figure 6A:
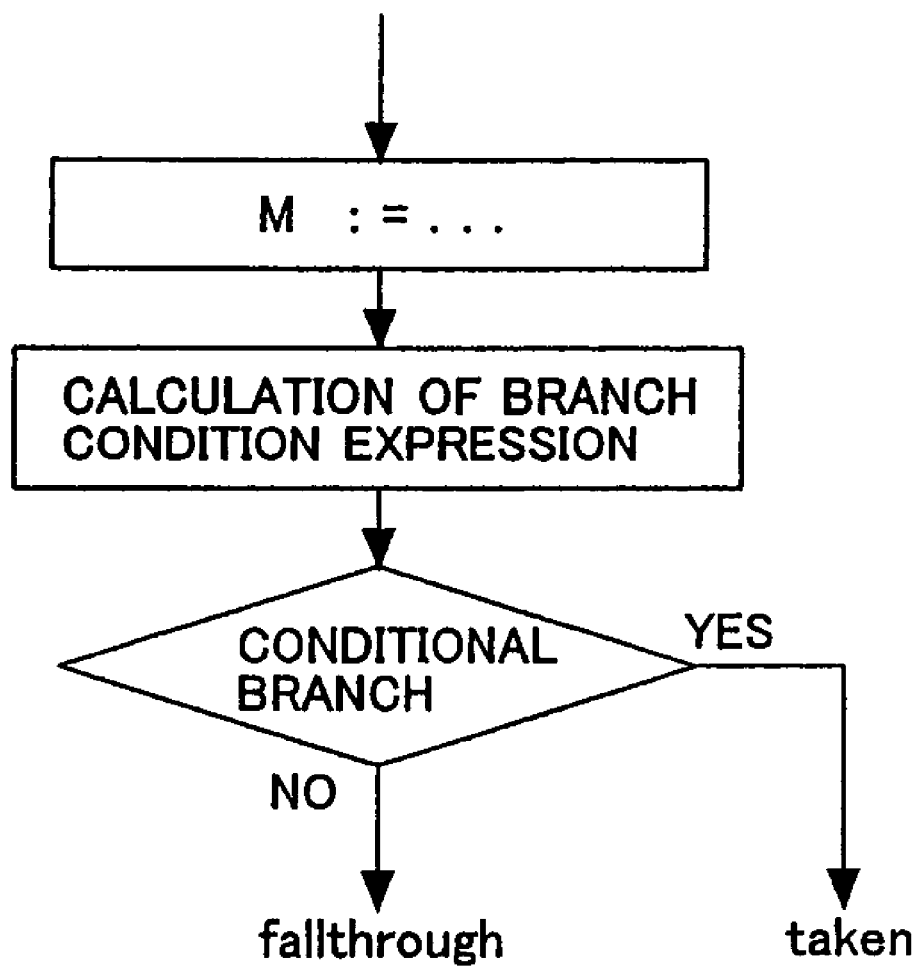
FIGS. 6(A) to 6(E) are flow charts illustrating a manner in which instructions are reordered in the first embodiment.

FIG. 6(A) schematically shows a structure of a basic block which is an object of processing of the instruction reordering section 23. "M:= . . . " in FIG. 6(A) signifies an instruction to store into the memory.

First in step 40 of FIG. 5, the instruction reordering section 23 investigates whether each of the intermediate terms and variables in the intermediate program is coordinated with a register or a memory. This is discriminated by trying register allocation partly similarly as in step 32 of FIG. 4. In the processes from step 32 up to step 40, only a fork destination is determined, but the intermediate program itself is not changed and the register allocation situation has no difference. Therefore, a result of the register allocation trial in step 32 should be saved and then the information should be referred to in step 40.

Figure 6B:
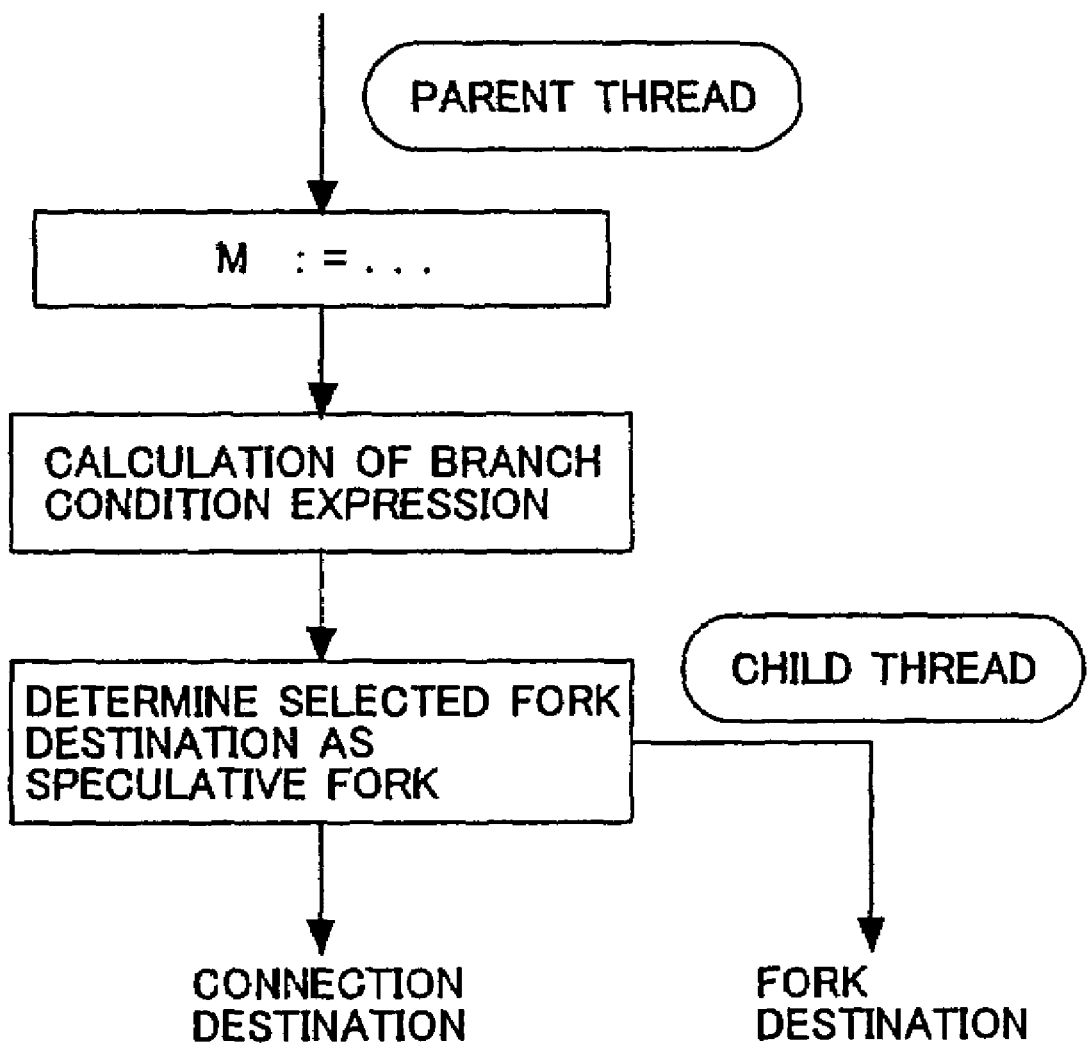

In next step 41, the branching instruction at the tail end of the basic block which is the object of processing at present is replaced with (converted into) the control speculation mode FORK instruction. The operand of the control speculation FORK instruction, that is, the fork destination, is set to the fork destination selected by the fork spot determination section 21. FIG. 6(B) shows a structure of the basic block when the processing up to step 41 is completed.

Figure 6C:
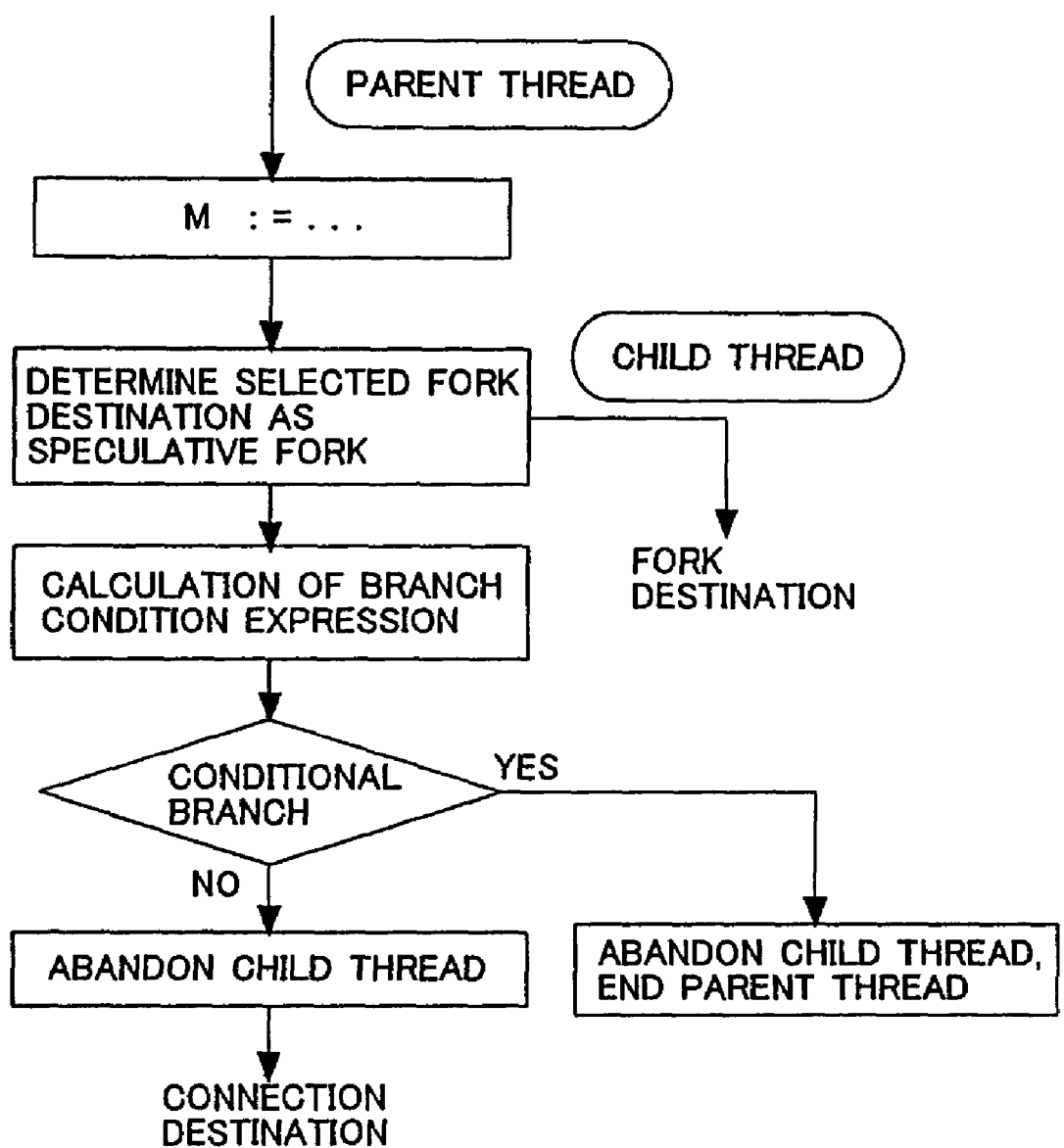

In step 42, a branching condition calculation statement (branching condition expression) positioned immediately prior to the control speculation FORK instruction in the intermediate program is moved to the position immediately next to the control speculation FORK instruction. Further, a sequence of instructions for "ending, when the branching condition is satisfied, the self thread and placing the child thread into a settlement mode which is a non-control speculation mode, but abandoning, when the branching condition is not satisfied, the child thread and keeping the self thread to continue execution of a succeeding instruction sequence" is inserted to the position immediately next to the destination of the movement, that is, to the tail end of the basic block. FIG. 6(C) shows a structure of the basic block when the processing up to step 42 is completed.

In step 43, each of statements which are positioned forwardly of the FORK instruction, that is, on the upstream side with respect to the FORK instruction in the basic block being the processing object at present and are to be substituted into the intermediate terms and variables coordinated with a memory in step 40 is moved to a position rearwardly of the FORK instruction, that is, on the downstream side with respect to the FORK instruction, and the BLOCK setting instruction is inserted immediately prior to the FORK instruction while the BLOCK clear instruction is inserted immediately next to the movement destination of the substitute statement. The operand of each of the BLOCK setting instruction and the BLOCK clear instruction to be inserted here is the memory address representative of a substitution destination intermediate term/variable of the moved substitution statement.

Depending upon the formal of the intermediate program, a particular memory address may not be settled as yet in this stage. In this instance, the BLOCK setting instruction and the BLOCK clear instruction should be represented using a form similar to that of the intermediate terms/variables in the intermediate program and then should be converted into an instruction sequence indicating an effective memory address when code generation from the intermediate program is performed later.

In step 43, from among the statements to be substituted into the intermediate terms and the variables coordinated with a register in step 40, these statements to be substituted into these intermediate terms/variables which may possibly be referred to by the fork destination must not be moved to the position next to the FORK instruction. The reason is that, since the value of the register is inherited by the child thread at the point of time of the fork, the register value defined by the parent thread after the fork is not delivered to the child thread. Since all statements cannot necessarily be moved to the position next to the FORK instruction in this manner, when a statement to be substituted into the memory is to be moved after the fork in step 43, the data dependence relationship between the statement to be moved and instructions succeeding the statement must be investigated and the statement must be moved only when an operation result same as that before the movement is obtained even if the execution order is changed by the movement.

It is to be noted that the data dependence relationship necessary in this instance may be a common one to the compiler technique, and in the embodiment of the present invention, it can be obtained by investigation based on the control flow and data flow analysis results produced by the intermediate program inputting section 20 shown in FIG. 2.

Figure 6D:
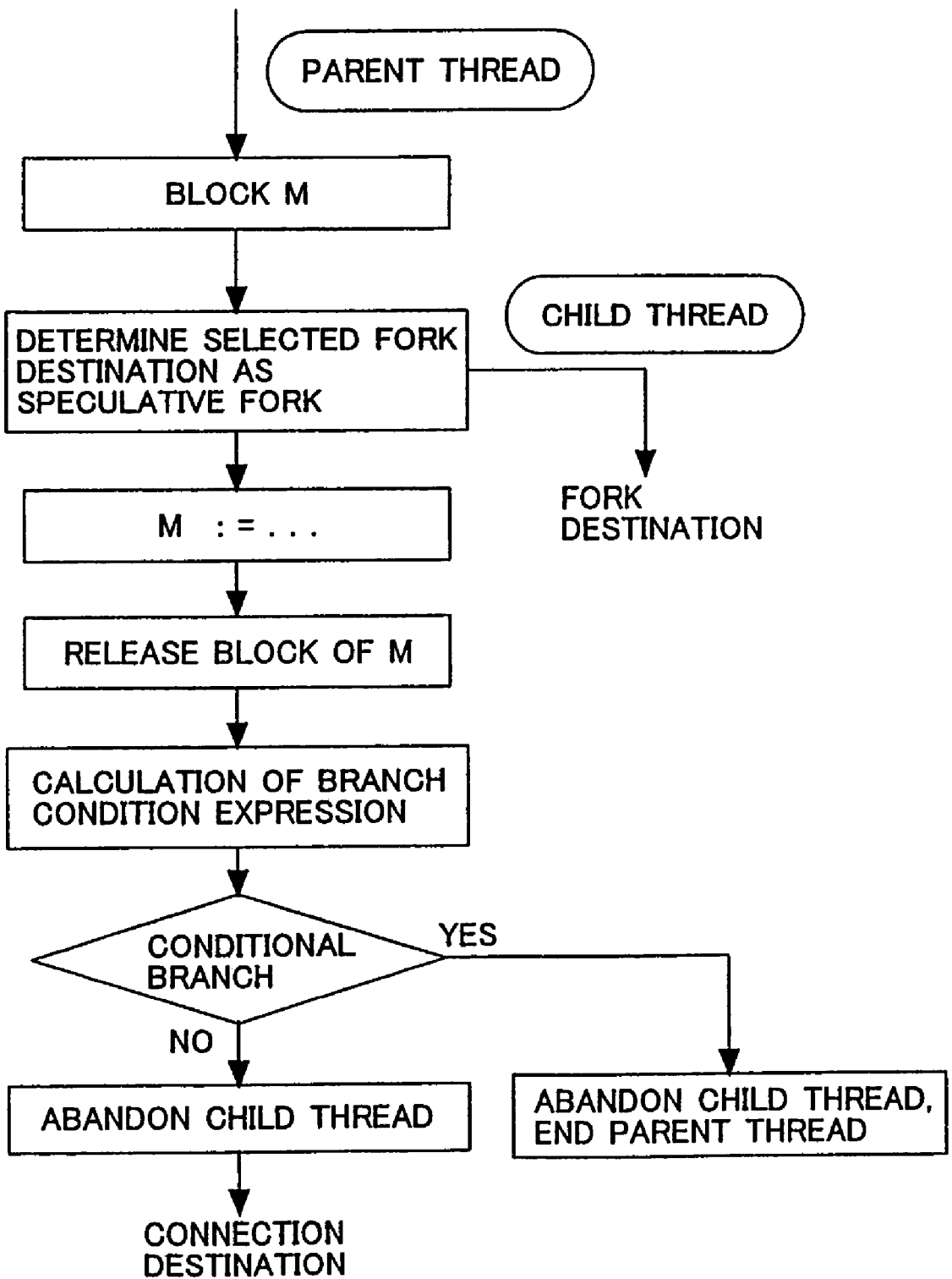

FIG. 6(D) shows a structure of the intermediate block when the processing up to step 43 is completed.

In step 44 of FIG. 5, the information assumed with regard to the register allocation of the intermediate terms and the variables in the preceding steps is inserted to the top of the basic block of the processing object at present. Since this information does not correspond to an actual machine instruction, it is described using the register allocation indication instruction which is a pseudo instruction on the intermediate program.

Figure 6E:
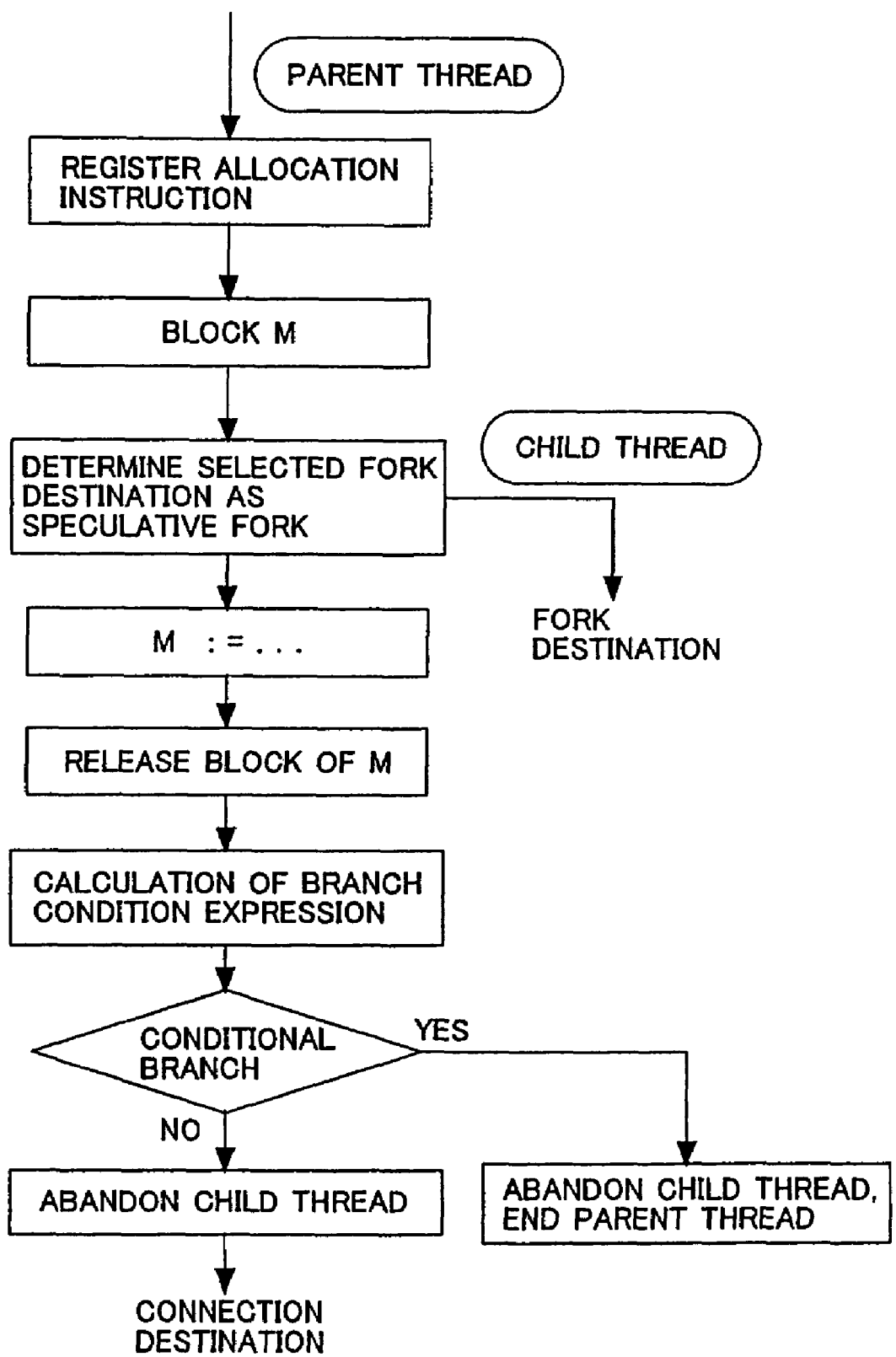

FIG. 6(E) shows a structure of the basic block, when the processing up to step 44 is completed.

It is one of characteristics of the embodiment of the present invention that the steps 40 and 44 are provided. In particular, the program conversion method includes the step 40 in which a register allocation situation is investigated prior to the fork conversion process in step 41 and the step 44 in which the register allocation situation assumed by the fork conversion process in step 41 is indicated to the register allocation section 22.

Therefore, detailed instruction reordering can be performed also for an intermediate program which uses intermediate terms and variable representations in the intermediate source program.

It is to be noted that the processes in steps 41 to 43 are similar to these described on pages 2,049 to 2,050 of Document 4 mentioned hereinabove.

Referring back to FIG. 2, the register allocation section 22 performs a register allocation process of coordinating areas allocated on the physical registers or the memory of the target architecture with the intermediate terms in the intermediate program.

As a basic method for register allocation, a method of allocating the areas to the intermediate terms in the descending order in frequency of use of the intermediate terms, an allocation method by coloring of an interference graph or a like method can be used. For such allocation methods, refer to, for example, the description on pages 659 to 665 of Document 5 mentioned hereinabove.

The register allocation process by the register allocation section 22 is different from the register allocation process by an ordinary compiler in that it operates in accordance with the register allocation indication instruction inserted in step 44 of FIG. 5. Where, for example, a method of allocating registers in the descending order in frequency of use of the intermediate terms is adopted as the register allocation method, the frequency of each intermediate term designated so as to be placed into a register by the register allocation indication instruction is set higher than these of the other intermediate terms to raise the possibility that the designated intermediate terms are allocated to the physical registers.

On the other hand, where a method according to coloring is adopted as the register allocation method, when several intermediate terms to be allocated to the memory are to be selected from among the intermediate terms corresponding to nodes each having a number of neighboring nodes exceeding the total number of physical resisters which can be allocated in the interference graph, these intermediate terms which are not designated so as to be placed into a register by the register allocation indication instruction inserted in step 44 of FIG. 5 are selected preferentially so as to raise the possibility that the intermediate terms designated so as to be allocated to a register may be allocated to the physical registers.

If the register allocation section 22 cannot allocate the physical registers to all intermediate terms designated so as to be placed into a register by the register allocation indication instruction, then such intermediate terms are allocated to a memory location. The reason is that, since the program is converted by the instruction reordering section 23 so that the value of an intermediate term presupposed to be allocated to a register may be settled forwardly of (on the upstream side with respect to) the FORK instruction, even if such intermediate terms are allocated on a memory, an execution result of the program does not vary.

On the contrary, the register allocation section 22 performs a register allocation process so that these intermediate terms which are not designated so as to be placed into a register by the register allocation indication instruction may not be allocated to a register. For this processing, a process similar to that for a variable whose address is referred to or a variable which cannot be arranged on a register such as a volatile variable in a conventional register allocation process can be applied.

WORKING EXAMPLES

The operation of the embodiment of the present invention described above is described in more detail in connection with particular working examples.

Working Example 1

FIG. 8 illustrates an example of an intermediate program to be parallelized by the parallelization apparatus 11 of the program conversion apparatus 2 or the embodiment of the present invention. Referring to FIG. 8, reference characters t1 to t28 denote intermediate terms, and I, J, K, R and X denote variables declared in the source program.

"=:" signifies that the value of the right side is stored into the place indicated by the left side.

"&" is a prefix operator which returns a memory address into which a variable is placed.

"mem(a)" indicates contents of the memory whose address is given by the value of a, and if this is on the right side to ":=", then this signifies memory load, but if this is on the left side, then this signifies memory store.

L1, L2 and L3 are labels.

The numerals (1) to (37) in parentheses indicated at the left end (column) of FIG. 8 are numbers applied for the convenience of description, and (B1) to (B3) at the right end represent basic block numbers.

FIG. 7 shows a table of instructions relating to control parallel on an intermediate program to be used for operation of the present working example.

SPFORK 1 is used to create a speculation (control) mode child thread for starting execution from the operand 1.

TTERM c is used to end the self thread and settle the child thread if the operand c is true.

FTERM is used to end the self thread and settle the child thread if the operand c is false.

THABORT is used to abandon the child thread of the speculation mode.

BLOCK m is used to designate a memory address designated with the operand m for block.

RELEASEm is used to clear the block set to a memory address designated with the operand m.

DSPIN is used to create a child thread created by a succeeding fork in the data-dependent speculation mode.

DSPOUT is used to clear the data-dependent speculation mode of the child thread.

RDCL t1, . . . is used to instruct to allocate intermediate terms/variables designated with the operand t1, . . . to a register.

MDCL t1, . . . is used to instruct to allocate intermediate terms/variables designated with the operand t1, . . . to a memory.

Referring to FIG. 2, the fork spot determination section 21 receives the intermediate program illustrated in FIG. 8 and determines a fork spot.

It is assumed that register allocation is attempted in step 25 of FIG. 3 and a trial result is obtained that a physical register is allocated to all intermediate terms t1 to t28 and the variables I, K and R while an area of a memory is allocated to the variables J and X.

In step 26 of FIG. 3, the basic block B1 including a conditional branching instruction is determined as an object of parallelization conversion. In the following, operation of a fork spot determination section 21 is described with reference to FIG. 4.

A look structure check is performed in step 31. However, since the conditional branch of (11) of FIG. 8 is not a loop return branch, the processing advances to step 32.

In step 32, the distance of data dependence is determined between the basic blocks B1 and B2 and between the basic blocks B1 and B3 of FIG. 8.

First, data dependence between the basic blocks B1 and B2 is examined. Here, data dependence is found between the memory store at (7) of the basic block and the memory load at (14), (18) and (19) of the basic block B2.

The memory accesses here actually are the store into the array element X[I] and the load from the variable J and the array element X[J], and if the memory locations for the array X and the variable J do not overlap with each other and the values of I and J are different from each other, then no data dependence occurs. In particular, in the block B1, t1:=&X in (11) places the top address of the array X into the intermediate term t1, and since one array element is composed of 4 bytes (t4=t2*t3) and t5=t1+t4, mem(t5) in (7) indicates the memory address for the array element X[I] and (7) represents the memory store of t6 into the memory address. Further, in the block B2, t15:=mem(t14) in (18) represents the memory load from the array element X[J].

Here, however, the description proceeds on the assumption that a result or the data dependence analysis indicates that a positive proof that such conditions are always satisfied is not obtained and it is discriminated that potential memory data dependence is present between the memory store and the memory load.

The distance of data dependence between the basic blocks B1 and B2 is 1.5 and 6 as counted with the number of steps on the intermediate program of FIG. 8. Here, since the label L1 in (12) is a non-executable statement, it is not counted in the step number, and the step number is counted in such a manner that the instruction in (13) is counted as 0, the instruction in (14) is counted as 1, and the instruction in (15) is counted as 2. Consequently, the minimum value of the distance of data dependence between the basic blocks B1 and B2 is 1.

Similarly, between the basic blocks B1 and B3, data dependence is found between (7) of the basic block B1 and (29) and (33) of the basic block B3, and the distance of data dependence is 5 and 9, respectively. Thus, the minimum value of the distance of data dependence between the basic blocks B1 and B3 is 5.

In step 33, the minimum values 6 and 10 of the distance of data dependence determined as above are compared with each other, and it is discriminated that the difference between them is sufficiently large. Consequently, the branching direction of the basic block B3 side which exhibits a higher minimum value of the distance of data dependence is selected as the fork destination.

If the prospect that the variable J is allocated not to a memory but to a register is obtained in step 25 of FIG. 3, then the minimum value of the distance of data dependence between the basic blocks B1 and B2 and between the basic blocks B1 and B3 is 5 and 9, respectively, and consequently, the basic block B2 side is selected as the fork destination in step 33.

Now, operation of the instruction reordering section 23 is described particularly with reference to FIG. 5. It is assumed that, in the present working example, the instructions relating to control parallel illustrated in FIG. 7 can be used on an intermediate program.

If the intermediate program described as an example in the foregoing description is given to the instruction reordering section 23, then the instruction reordering section 23 performs an instruction reordering process so as to perform the fork from the basic block B1 to the basic block B3.

In step 40 of FIG. 5, the instruction reordering section 23 acquires the information that the intermediate terms t1 to t28 and the variables I, K and R are allocated to a register.

In step 41 of FIG. 5, the instruction reordering section 23 replaces the branching instruction in (11) of FIG. 8 (goto L2 next to then) with the SPFORK instruction which is a control speculation FORK instruction. The operand of the SPFORK instruction is the basic block B3 determined as the fork destination, that is, the label L2 (SPFORK L2 in (58) of FIG. 9).

In step 42 of FIG. 5, a series of instructions (8) to (10) which form a statement for calculation of the conditional branch in FIG. 8 is moved to the position immediately next to the SPFORK instruction, and the FTERM instruction (an instruction to end the self thread when the condition is not satisfied) which is a conditional thread ending instruction conforming to the branching condition of (11) and the THABORT instruction as well as an unconditional branching instruction (goto L1) to the basic block B1 which is a succeeding block are inserted next to the moved series of instructions (8) to (10).

The instruction sequence mentioned is inserted so as to achieve the following operation.

In particular, after the SPFORK, branch condition calculation is performed to discriminate whether or not the SPFORK is really correct.

If the SPFORK is correct (speculation success), then the self thread (parent thread) is ended and simultaneously the created child thread is changed in mode from the control speculation mode to the settlement mode (a non-control speculation mode) with the FTERM which is a kind of conditional thread ending instruction.

Figure 9:
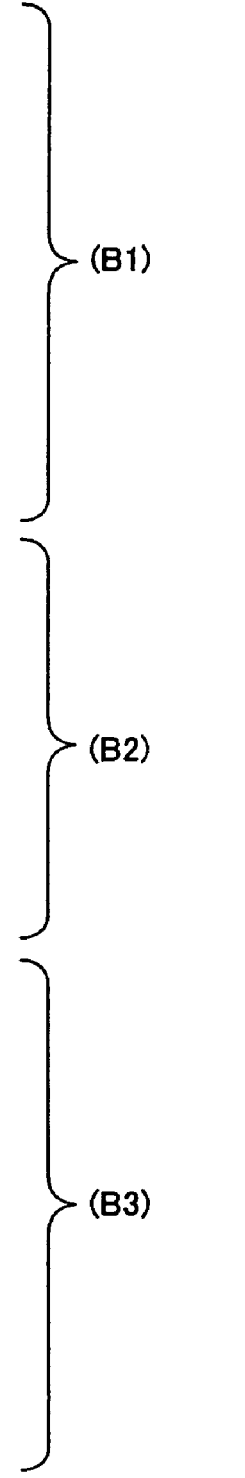

On the other hand, if the SPFORK is not correct (speculation failure), then the FTERM instruction does nothing, and the child thread is abandoned with the succeeding THABORT instruction, and the self thread continues its execution of instructions of the branching destination opposite to the FORK destination with the unconditional branching instruction (goto 1,1 in (64) of FIG. 9). FIG. 9 illustrates the intermediate program which has been subject to the conversion up to step 42 of FIG. 5 from the intermediate program illustrated in FIG. 8.

In step 43 of FIG. 5, a series of instructions (56) and (57) of FIG. 9 which form a memory store statement is moved to the position immediately next to the SPFORK instruction (58) ((108) and (109) of FIG. 10), and the RELEASE instruction is inserted to the position immediately next to the moved series of instructions ((110) of FIG. 10)

For the operand of the RELEASE instruction, the same intermediate term as the operand of the moved store instruction (57) is used. Further, the BLOCK instruction whose operand is the same intermediate term as the operand of the store instruction (57) is inserted to the position immediately preceding to the SPFORK instruction (58). FIG. 10 illustrates the intermediate program which has subject to the conversion up to here.

Here, the reason why, upon movement of the memory store statement after the FORK, not all of the instructions (51) to (57) but only the instructions (56) and (57) are moved is that it is intended to make it possible for an intermediate term having an effective memory address to be re-utilized with the BLOCK instruction and the RELEASE instruction. If an optimization function called "common subexpression elimination" in the field of the compiler is used, redundant effective address calculation is deleted by common subexpression elimination optimization even if such program conversion as to recalculate an effective address each time the BLOCK instruction or the RELEASE instruction is executed is performed here.

In step 44 of FIG. 5, the RDCL instruction and the MDCL instruction are inserted to the top of each of the basic blocks B1, B2 and B3. The instructions are for the register allocation section 22 in the following stage, and the RDCL instruction is used to perform register allocation to a designated variable or intermediate term whereas the MDCL instruction is used to perform allocation of a memory location to a designated variable or intermediate term.

FIG. 11 illustrates the intermediate program which is subject to the conversion up to here. The instructions (201) to (203), (221) to (223) and (235) to (237) have been inserted in step 44.

Referring back again to FIG. 2, after the instruction reordering, the register allocation section 22 allocates a physical register to each variable or intermediate term which is to be placed into a register.

In the present embodiment, the architecture (target architecture) of an apparatus by which a target program outputted from the program conversion apparatus is executed has 32 physical registers r0 to r31, and such register allocation is performed that the physical registers r10 to r19 are used for register variables (these of variables in the source program which are allocated to physical registers) and the physical registers r20 to r30 are used for working registers (registers principally for holding results during arithmetic operation).

The register allocation section 22 allocates the physical registers r11, r12 and r13 to the variables I, K and R, respectively, and allocates the physical registers r20 to r30 in order to the intermediate terms t1 to t28.

FIG. 12 illustrates the intermediate program after the registers are allocated to the intermediate program illustrated in FIG. 11. It is to be noted that, although the intermediate program of FIG. 12 includes redundant instructions, redundancies of them can be eliminated by an optimization process proposed conventionally. Various conventional optimization methods are recited, for example, on pages 772 to 790 of Document 5 mentioned hereinabove.

Since such optimization processes are preferably performed before register allocation, they are incorporated preferably forwardly of the fork spot determination section 21 in FIG. 2, for example, in the inside of the intermediate program inputting section 20.

Embodiment 2

Now, a second embodiment of the present invention is described in detail. The second embodiment of the present invention is characterized in that profile information is referred to to select a data save dealing method of the fork destination and upon the fork. However, the second embodiment of the present invention is basically same in the other points as the first embodiment described hereinabove.

Referring to FIG. 1. in the second embodiment of the present invention, the program conversion apparatus 2 is used to produce a target program 3 from a source program 1. At this time, the program conversion apparatus 2 embeds information for coordination between a machine instruction address and an intermediate program used in the program conversion apparatus 2 into the target program 3. The target program execution apparatus 4 executes the target program 3, collects execution information during the execution of the target program 3 and outputs the collected execution information as a profile information file 5.

Then, the program conversion apparatus 2 is used to is parallelize the source program 1 to produce the target program 3. At this time, the profile information file 5 is used to produce a target program 3 having a higher execution performance.

The configuration of the program conversion apparatus 2 is substantially similar to that in the first embodiment described hereinabove. However, the program conversion apparatus 2 is different in operation of the fork spot determination section 21 and the instruction reordering section 23 thereof from that in the first embodiment in that the fork spot determination section 21 and the instruction reordering section 23 refer to the profile information to perform a parallelization process with which a higher execution performance can be anticipated.

The operation of the fork spot determination section 21 in the second embodiment of the present invention is generally same as that in the first embodiment described hereinabove with reference to FIG. 3. In particular, the fork spot determination section 21 tries, for each function in an intermediate program given thereto, register allocation in the, function in step 26 of FIG. 3 and then performs a fork spot determination process for each conditional branch instruction included in the function in step 27.

Figure 13:
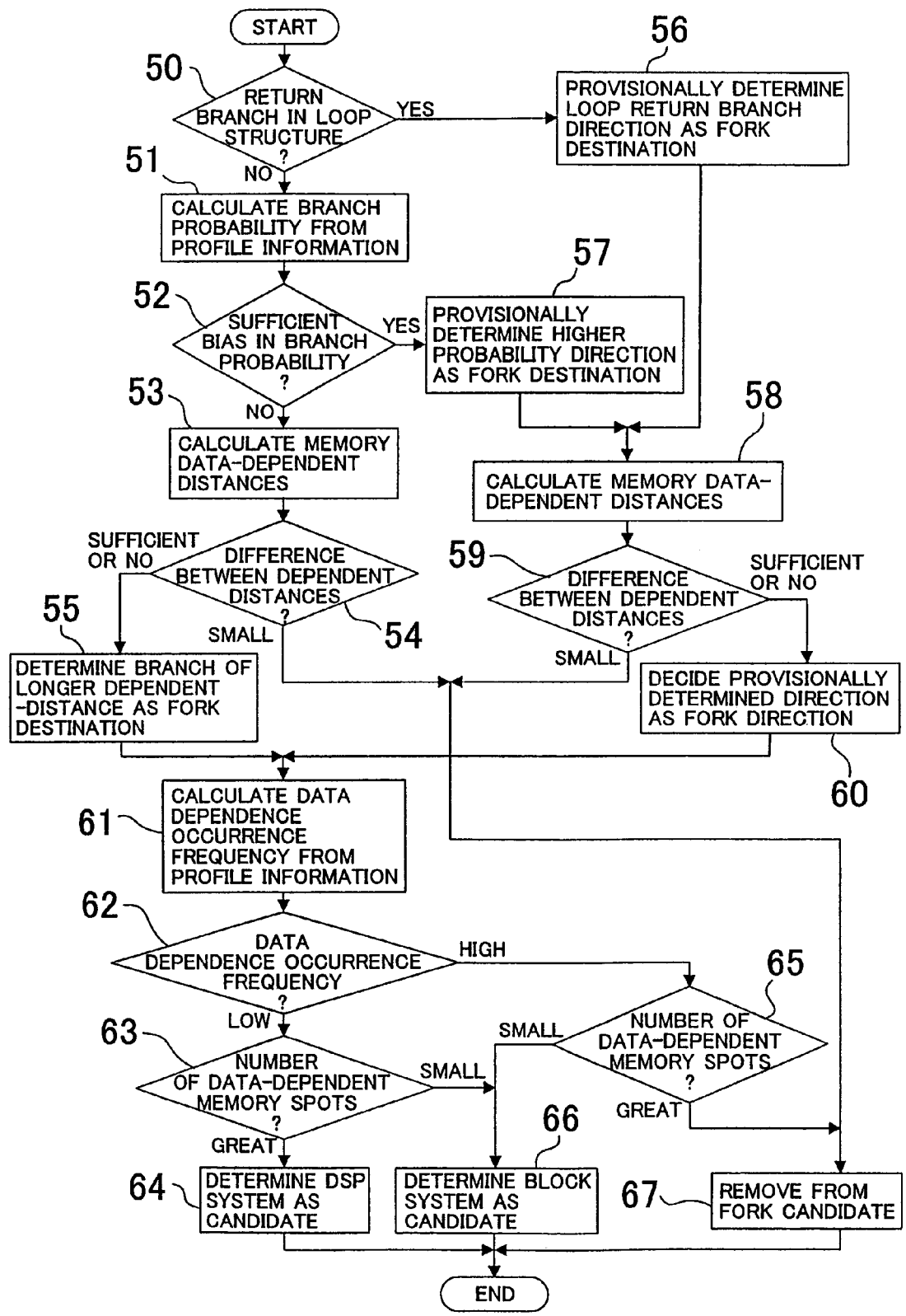
FIG. 13 is a flow chart illustrating operation of a fork spot determination section in a second embodiment of the present invention.

FIG. 13 illustrates the fork spot determination process (step 26 of FIG. 3) for a conditional branching instruction in the second embodiment Referring to FIG. 13, in step 50, the fork spot determination section 21 discriminates whether or not the conditional branching instruction corresponds to a return branch of a loop structure in the inputted intermediate program. This process is same as that in step 31 (refer to FIG. 4) in the first embodiment described hereinabove.

If the conditional branching instruction is a return branch of a loop structure, then the direction of the return branch is provisionally determined as the fork destination. This signifies that, if the fork is to be performed, then this direction should be determined as the fork destination, and it is determined in a later stage whether or not the fork is performed actually In step 51, the fork spot determination section 21 calculates probabilities with which the taken (branching satisfaction) side/fall-through side or the conditional branching instruction are selected based on the received file information.

In step 52, the fork spot determination section 21 discriminates whether or not the two probabilities calculated in step 51 have a difference greater than a fixed value.

If the difference between the branch probabilities exceeds the criterion, then the side which exhibits a higher probability is provisionally determined as the fork destination.

In step 53, the minimum value of the distance of data dependence is calculated for each of the two branching destinations of the conditional branch. This process is the same as that in step 32 (refer to FIG. 4) in the first embodiment described hereinabove.

In step 54, the two minimum values of the distance of data dependence determined for the opposite sides of the conditional branch in step 53 are compared with each other to discriminate whether or not they have a difference equal to or greater than a fixed value.

When they have a difference equal to or greater than the fixed value or no data dependence is found, the branching direction of the side which exhibits a higher minimum value of the distance of data dependence is determined as the fork destination in step 55. This is a process similar to that in step 33 (refer to FIG. 4) in the first embodiment described hereinabove.

In steps 58 and 59, the fork spot determination section 21 calculates the minimum value of the distance of data dependence in a similar manner as in step 53 with regard to the fork destination provisionally determined in step 56 or 57 and discriminates whether or not the minimum value of the distance of data dependence of the provisionally determined fork destination side is equal to or greater than a fixed value If the minimum value of the distance of data dependence of the provisionally determined fork destination side is equal to or greater than the fixed value or data dependence through a memory is not found, then the fork destination provisionally determined in step 56 or 57 is decided as the formal fork destination in step 60.

If it is discriminated in step 54 or 59 that the minimum value of the distance of data dependence is lower than the fixed level, then the basic block is excepted from the fork spot in step 67. This is performed, for example, by applying a fork target exception mark to the conditional branching instruction so that the basic block may be excepted from an object of parallelization in later processing.

After the conditional branching instruction is determined as the fork spot or one of the branching destinations of the branching instruction is determined as the fork destination in steps 50 to 60, a data dependence occurrence frequency is calculated in step 61. In particular, the fork spot determination section 21 calculates, based on the profile information, a ratio of the number of times by which a value defined in the basic block of the fork source (the basic block which includes, at the tail end thereof, the branching instruction which is the processing object at present, is referred to by the basic block determined as the fork destination to the number of times by which this path the flow of control from the current basic block to the basic block determined as the fork destination) is passed.

In this data dependence occurrence frequency calculation, data dependence by these intermediate terms and variables which are finally allocated to a register is excepted and only those intermediate terms and variables arranged on the memory are used as an object of calculation similarly as in step 32 of FIG. 4.

In stop 62, it is discriminated whether or not the data dependence occurrence frequency is equal to or higher than a fixed level. If the data dependence occurrence frequency is higher, then the processing advances to step 65, but otherwise, the processing advances to step 63.

In step 63, the fork spot determination section 21 counts the number of these intermediate terms/variables on the memory which may possibly cause data dependence from the fork source basic block to the fork destination basic block and discriminates whether or not the count value as equal to or higher than a fixed level. This counting is performed statically by inspection of the instruction sequence in the intermediate program without depending upon the profile information. If the data dependence spot number is equal to or greater than the fixed level, then the fork spot determination section 21 determines that the fork according to the DSP system should be used in step 64, but otherwise. the fork spot determination section 21 determines that the fork according to the BLOCK system should be used in step 66. Then, the fork spot determination section 21 applies the information of the determination to the FORK instruction in the intermediate program.

In step 65 the fork spot determination section 21 counts the number of these variables on a memory which exhibit data dependence similarly as in step 63. If the count value is equal to or smaller than a fixed level, then it is determined in step 66 that the fork according to the BLOCK system should be used, but if the count value is greater than the fixed level, then the basic block is excepted from the fork candidate in step 67.

Figure 14:
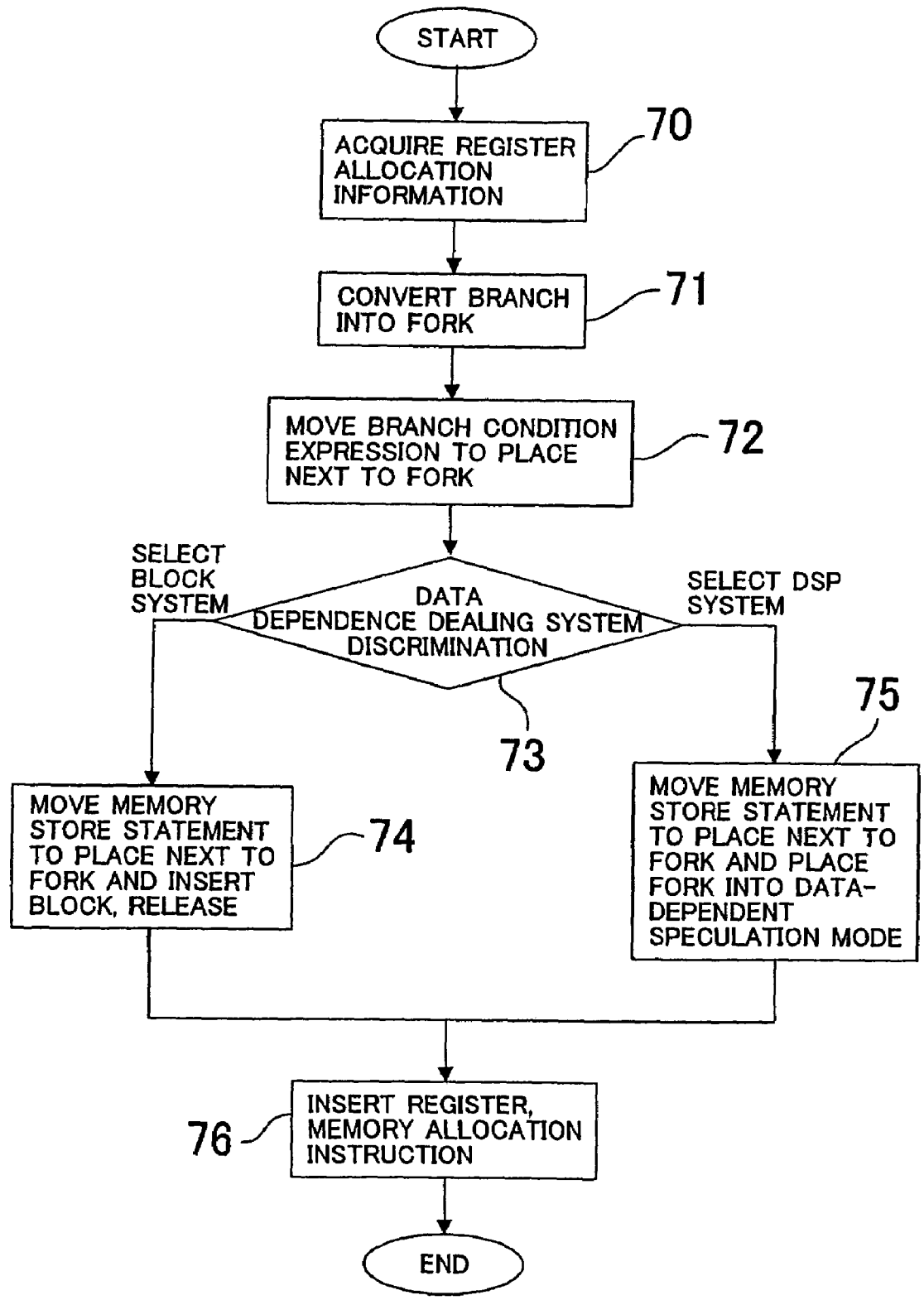
FIG. 14 is a flow chart illustrating operation of an instruction reordering section in the second embodiment.
Figure 18:
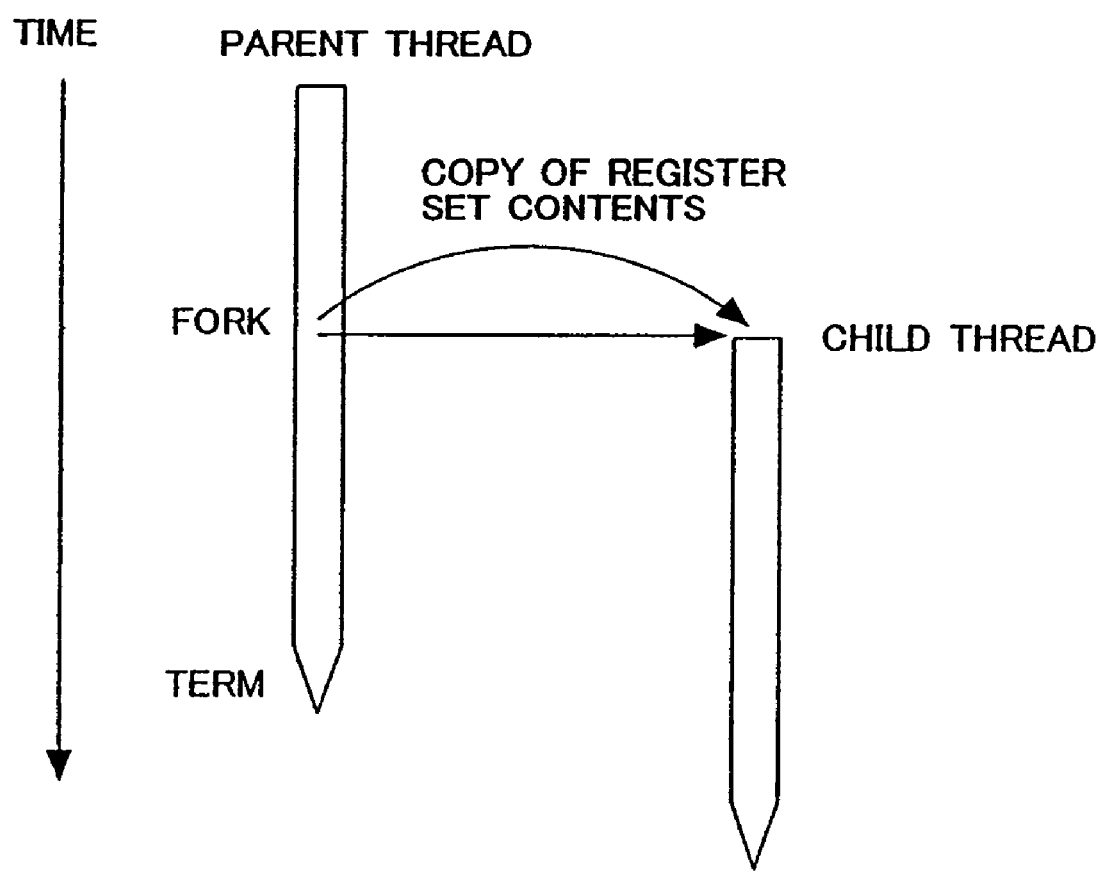
FIG. 18 is a diagrammatic view illustrating a FORK instruction of a known MUSCAT architecture.
Figure 19:
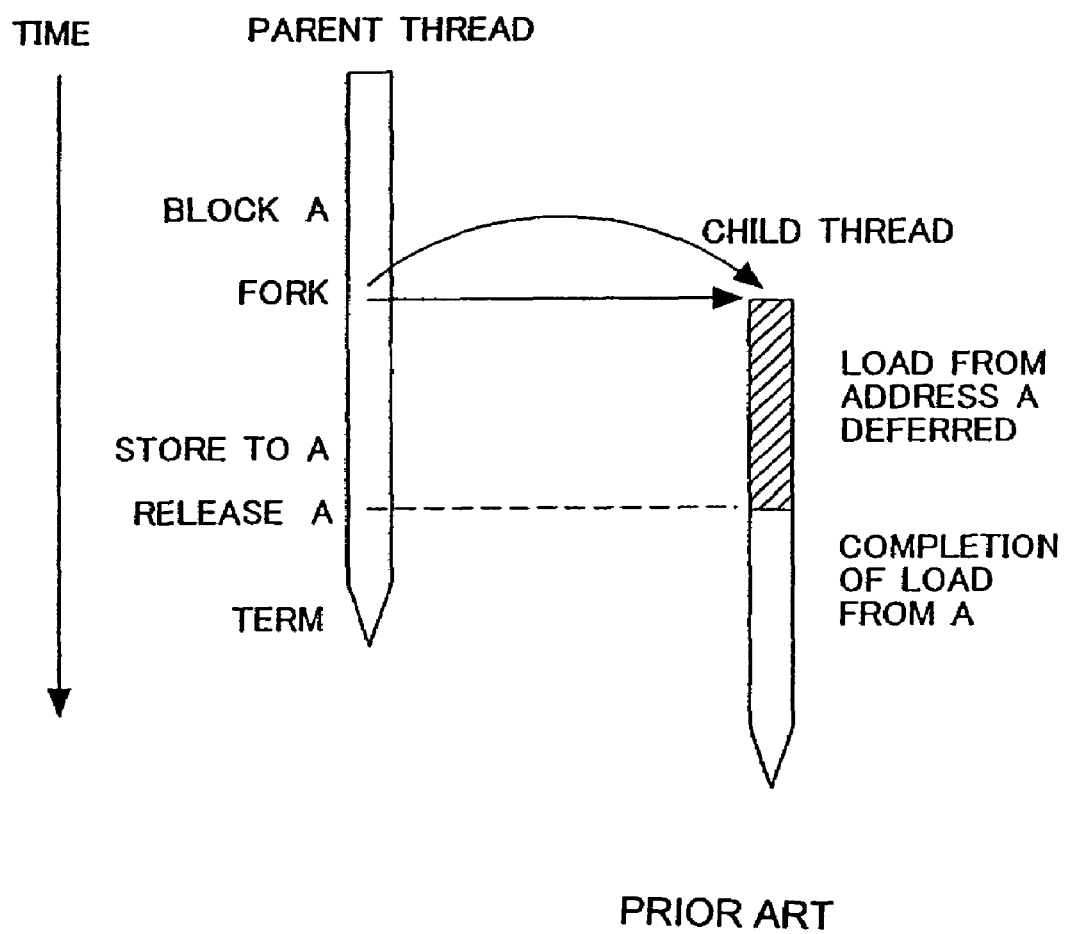
FIG. 19 is a similar view but illustrating a BLOCK system of the known MUSCAT architecture.
Figure 20A:
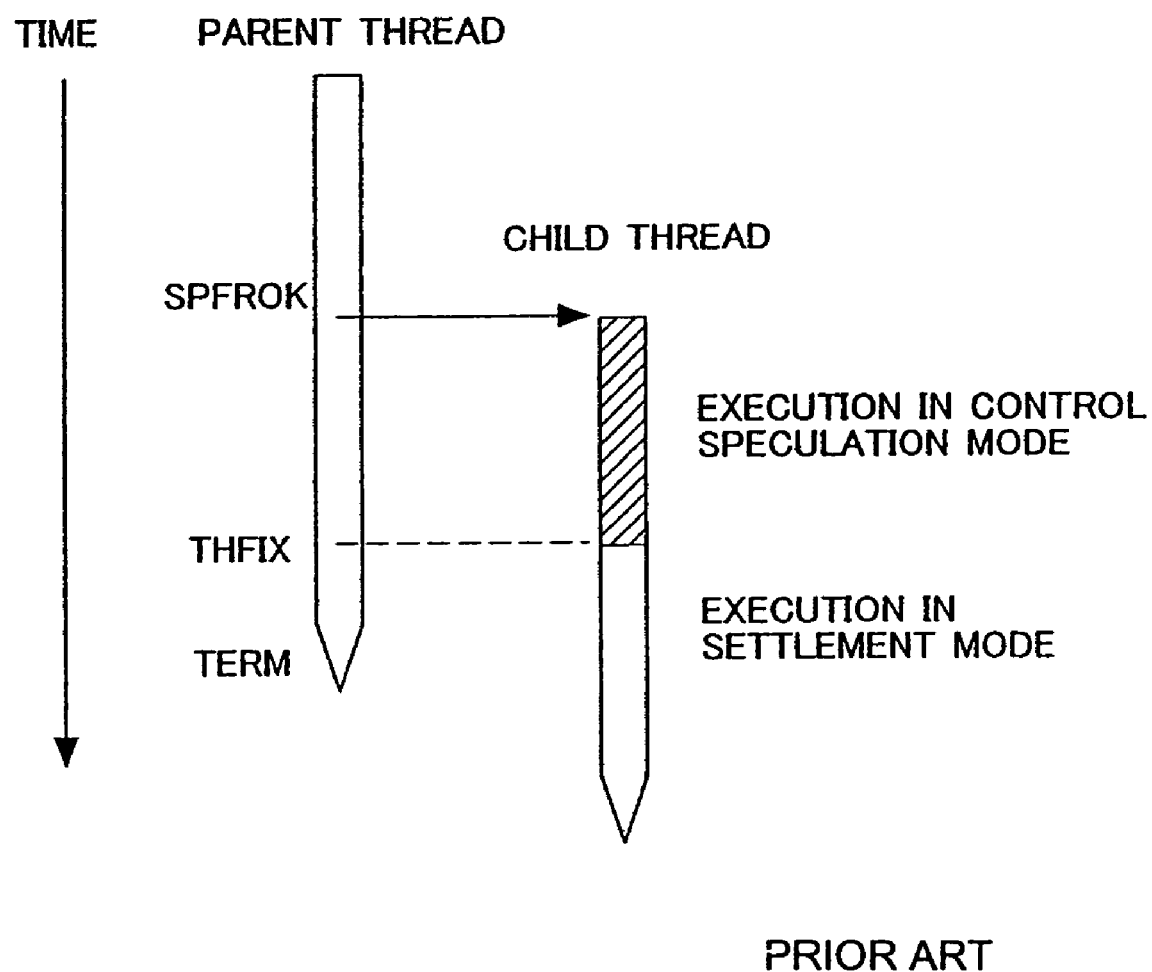
FIGS. 20(A) and 20(B) are similar views but illustrating a control speculation mode of the known MUSCAT architecture.
Figure 20B:
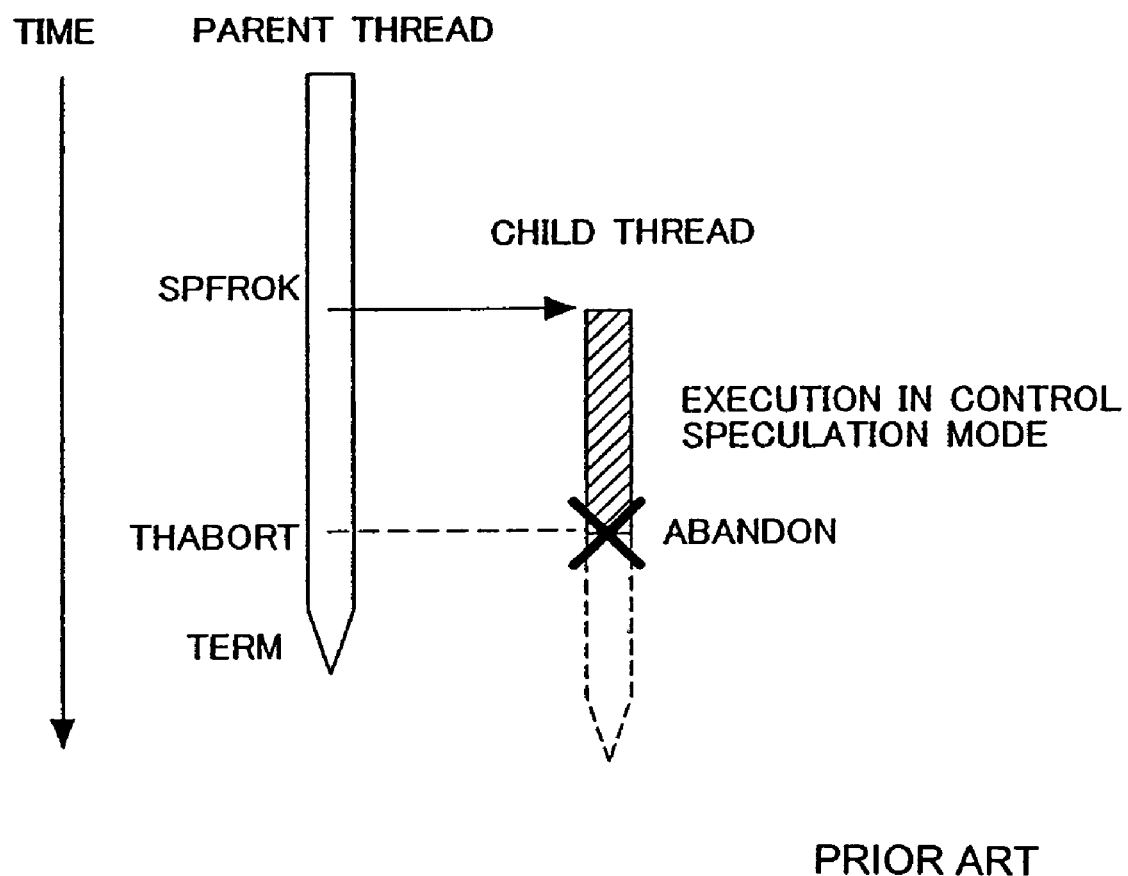
Figure 21:
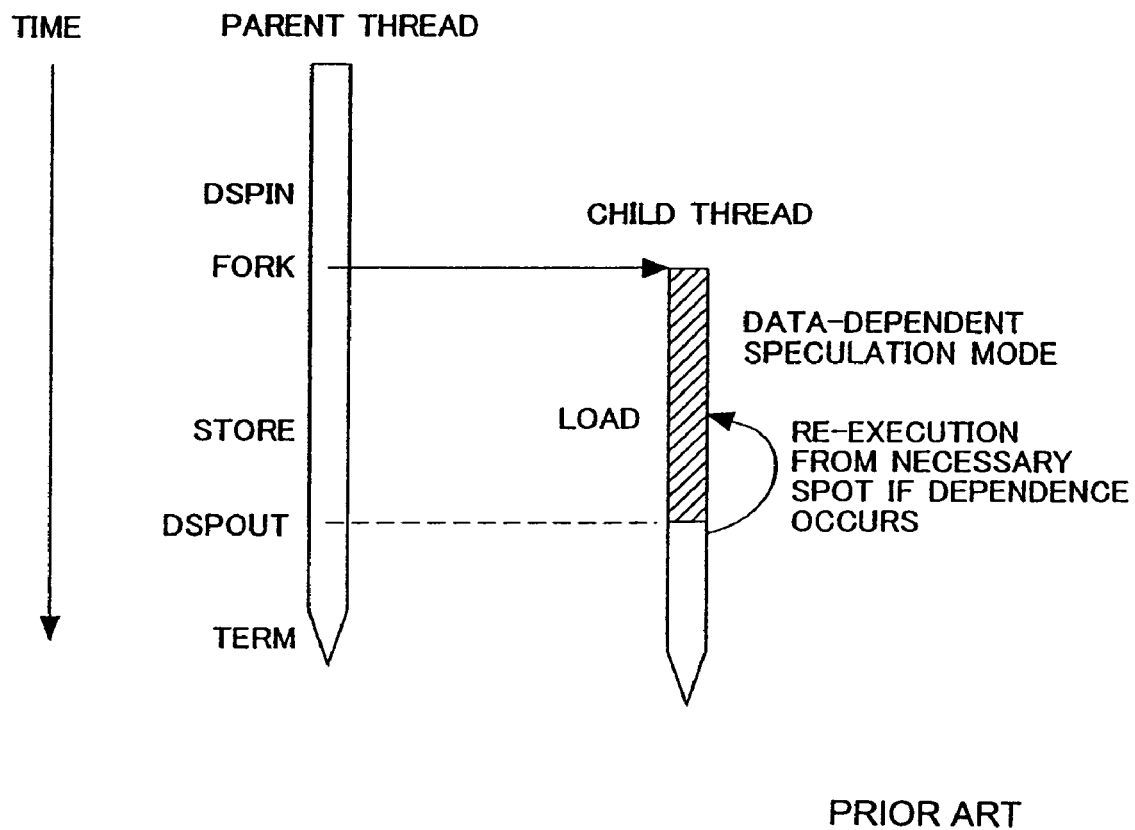
FIG. 21 is a similar view but illustrating a data-dependent speculation mode of the known MUSCAT architecture.

FIG. 14 illustrates operation of the instruction reordering section 23 in the second embodiment of the present invention. Referring to FIG. 14, the instruction reordering section 23 performs a series of processes from step 70 to step 76 based on a fork spot and a fork data assurance method determined by the fork spot determination section 21. It is to be noted that the processes in steps 70 to 76 are all performed for an intermediate program. The instructions which appear in the description of the steps all denote corresponding instructions on the intermediate program.

The processes in step 70, 71 and 72 are similar to those in steps 40, 41 and 42, respectively, of FIG. 5 described hereinabove in connection with the first embodiment.

In step 73, the instruction reordering section 23 checks whether the fork data assurance system for the fork spot, determined by the fork spot determination section 24 in the preceding stage is the BLOCK system or the, DSP system. If the fork data assurance system is the BLOCK system, then the processing advances to step 74, but if the fork data assurance system is the DSP system, then the processing advances to step 75.

The process in step 74 is similar to that in step 43 of FIG. 5 described hereinabove in connection with the first embodiment. In particular, a memory store statement before the fork is moved to the position next to the fork and necessary BLOCK setting and BLOCK clear instructions are inserted.

Upon such movement, a data dependence relationship is inspected, and the statement must be moved only when an operation result same as that before the movement is obtained even if the execution order is changed by the movement, similarly as in step 43 of FIG. 5.

Also the process in step 76 is similar to that in step 43 of FIG. 5 in that a substitute statement into an intermediate terminal coordinated with a memory is moved to the position next to the FORK instruction. However, whereas, in step 43 of FIG. 5, the BLOCK setting instruction and the BLOCK clear instruction whose operand is the memory address of the accessing object are inserted in step 43 of FIG. 5, the process in step 75 is different in that the FORK instruction produced in step 71 is modified so that the fork may be performed in the data-dependent speculation mode.

The process in step 76 is similar to that in step 44 of FIG. 5 described hereinabove in connection with the first embodiment.

In this manner, in the second embodiment of the present invention, profile information is used to determine whether or not the fork should be performed and the data dependence assurance method upon the fork. Therefore, where the flow of control is biased to one of the branches at a conditional branch, the success probability of the control speculation fork is raised by forking the direction.

Further, since parallelization is performed taking the frequency of actually occurring data dependence and the number of dependent spots into consideration, the overhead upon execution of a parallelization program is decreased thereby to make it easier to extract the performance by parallelization.

Working Example 2

Now, operation of the second embodiment of the present invention is described in connection with a particular working example. FIG. 15 illustrates an example of an intermediate program to be parallelized by the parallelization apparatus of the present invention. Characters, symbols and so forth appearing in FIG. 15 have the same meanings as these used in the first working example and illustrated in FIG. 8. Also the instructions relating to control parallel used on the intermediate program are same as those used in the first embodiment and illustrated in FIG. 7.

Referring to FIG. 1, in the second working example of the present embodiment, the program conversion apparatus 2 converts the source program 1 into the target program 3 without parallelizing the source program 1. Thereupon, the program conversion apparatus 2 inserts, to the top of each basic block, a label having a name based on an identification number of the basic block and places symbol information regarding such labels into the target program 3 so that the symbol information is outputted together with the target program 3. To embed symbol information into a target program is a very common practice in the field of the compiler, and any technique can be used only if a symbol name and an address coordinated with the symbol can be extracted from the target program.

The target program execution apparatus 4 reads in the target program 3 and recognizes a set of basic blocks in the target program 3 based on symbol information embedded in the target program 3. Consequently also the target program execution apparatus 4 can recognize the basic block set whose delimiting manner is equivalent to that of the basic block set which composes the intermediate program in the inside of the program conversion apparatus 2.

The target program execution apparatus 4 decodes and executes machine instructions which compose the road in target program 3 while it collects information of behavior, of the target program 3, particularly of:

(1) the number of times by which the condition of each conditional branching instruction is satisfied and the number of times by which the condition is not satisfied; and (2) the number of times of memory data dependence between basic blocks which are adjacent each other on the control flow and pertaining machine instruction addresses.

After execution of the target program 3 is completed, the target program execution apparatus 4 converts the machine instruction addresses from within the collected information into identification numbers of basic blocks and outputs a profile information file 5 which includes contents of:

(1) the number of times by which the control flows from each basic block to a succeeding basic block on the control flow; and (2) the number of times by which memory data dependence is caused between basic blocks which are adjacent each other on the control flow.

FIGS. 16(A) and 16(B) illustrate part of profile information included in the profile information file 5 outputted from the target program execution apparatus 4 when a target program corresponding to the intermediate program illustrated in FIG. 15 is given to the target program execution apparatus 4.

FIG. 16(A) illustrates the number of times of branching between basic blocks and indicates that the number of times of branching, for example from the basic block B11 to the basic blocks B12 and B13 is 20 and 180 respectively.

FIG. 16(B) illustrates the number of times of memory data dependence between basic blocks and indicates that the total number of times by which, for example a value stored in the basic block B13 is loaded in the basic block B16 is 120.

Now, operation of parallelizing the source program 1 when the profile information file 5 is given to the program conversion apparatus 2 is described.

Referring now to FIG. 2, the intermediate program 6 which is quite same as that when the source program is converted for the first time is given to the parallelization apparatus 11.

The intermediate program inputting section 20 reads in the intermediate program 6 and performs a flow analysis and then delivers the intermediate program 6 to the fork spot determination section 21.

On the other hand, the profile information inputting section 25 reads in the profile information file 5 produced by the target program execution apparatus 4. Contents of the profile information read in by the profile information inputting section 25 when the example of intermediate program of FIG. 15 is used are such as illustrated in FIGS. 16(A) and 16(B).

Referring to FIG. 2, the fork spot determination section 21 receives the intermediate program illustrated in FIG. 15 and performs determination of a fork spot.

It is assumed that, in step 25, of FIG. 3, register allocation is tried and a physical register is allocated to all of the intermediate terms t1 to t43 and the variables J and P while an area of the memory is allocated to the variables K, X, Y and Z.

In step 26 of FIG. 3, the basic blocks B11, B13 and B15 each of which includes a conditional branch are determined as an object of parallelization conversion.

In the following, operation of the fork spot determination section 21 for the basic blocks B11, B13 and B15 is described with reference to FIG. 13.

It is discriminated in step 50 that the basic block B11 is not a loop return branch.

In step 51, branching probabilities are calculated from the profile information illustrated in FIG. 16(A), and it is determined that the probability of branching to the basic block B12 is 10% and the probability of branching to the basic block B13 is 90%.

In step 52 using it as a criterion whether or not there is a bias of two times or more in ratio, the fork spot determination section 21 discriminates that the bias in branching probability from the basic block B11 is sufficient and thus provisionally determines that the basic block B13 is the fork destination in step 57.

In step 58, memory data dependence is investigated. However, since the basic block B11 does not include the memory store, the basic block B13 is determined as the fork destination in step 60.

Then in step 61, a data dependence occurrence frequency is determined. However, since there is no memory data dependence regarding the basic block B11 after all the BLOCK system is decided as a candidate in step 66.

The branch probability of the basic block B13 is 15% to the basic block B13 and 85% to the basic block B15, and except this, the basic block B13 is subject to similar steps to those for the basic block B11 described above. After all, it is determined in step 60 that the basic block B15 is the fork destination, and the BLOCK system is determined as a candidate in step 66.

With regard to the basic block B15, the branching probability is 15% to the basic block B16 and 85% to the basic block B17, and it is discriminated in step 52 that the bias in branching probability is sufficient. Thus, the basic block B17 is provisionally determined as the fork destination in step 57.

The minimum value of the distance of data dependence from the basic block B15 to the basic block B17 is 6, and if the criterion in step 59 is that the distance of data dependence is 4 or more, then the basic block B17 is determined as the fork destination in step 60.

If the data dependence occurrence frequency from the basic block B15 to the basic block B17 is determined in step 61 based on the profile information illustrated in FIGS. 16(A) and 16(B) then it is 4/170 and hence approximately 2.4%.

If the criterion for the occurrence frequency in step 62 is 30%, then it is discriminated that the occurrence frequency above is low.

In step 63, the number of memory accessing spots which may possibly cause data, dependence is counted from within the intermediate program.

The basic block B15 includes mem at the two spots on the left side and includes the variable K, which is allocated on a memory, at one spot on the left side.

The memory stores listed all have the possibility that overlapping of an address may occur with the memory load in the basic block B17, and therefore, totaling three memory data-dependent spots are found.

If the criterion for the number of dependent memory spots in step 63 is 3 or more, then it is discriminated that the basic block B16 has a greater number of dependent spots, and consequently, the DSP system is determined as a candidate to the fork system in step 64.

Here, if it is assumed that the branching probability from the basic block B15 to the basic blocks 16 dud 17 is 40% and 60%, respectively, then it is discriminated in step 52 that the bias in branching probability is small.

If the distance of data dependence is determined in step S53, then the minimum value of the distance of data dependence from the basic block B15 to the basic block B16 is 5 and also the minimum value of the distance of data dependence from the basic block B15 to the basic block B17 is 5. Consequently it is discriminated in step 54 that the difference between the dependence distance is small.

Consequently, the basic block B15 is excepted from a candidate to the fork spot in step 67.

Now, operation of the instruction reordering section 23 in the second working example is described particularly with reference to FIG. 14.

The instruction reordering section 23 performs a series of processes illustrated in FIG. 14 for each of the conditional branches of the basic blocks B11, B13 and B15.

With regard to the basic block B11, the SPFORK instruction to the basic block B13 is produced in step 71, and an instruction group for conditional expression calculation is moved to the position next to the SPFORK instruction in step 72.

For the data dependence assurance in the fork from the basic block B11, the BLOCK system is determined as a candidate. However, since a memory access to be blocked is not present, the BLOCK instruction or the RELEASE instruction is not inserted in step 74.

In step 76, the RDCL instruction whose operand is the intermediate terms t1, t2 and t3 scheduled to be placed into the register is inserted.

Also the basic block B13 is processed in a flow similar to that for the basic block B11 described above since data dependence assurance of the BLOCK system is performed.

As regards the basic block B15, since data dependence assurance is performed in accordance with the DSP system, movement of a memory store instruction group is performed and an instruction indicating the data-dependent speculation mode is inserted in step 75 of FIG. 14.

In particular, mem(t12), mem(t17) and a statement for store into the variable K are moved to the position next to the SPFORK instruction, and the DSPOUT instruction indicating to end the data-dependent speculation mode is inserted to the position immediately next to them.

Further, the DSPIN instruction indicating to create a child thread in the data-dependent speculation mode is inserted to the position immediately prior to the SPFORK instruction.

FIG. 17 illustrates the intermediate program after the processing of the instruction reordering section 23 in the second embodiment of the present invention is completed.

It is to be noted that the embodiments described above may be carried out in combination with some other fork spot/fork destination determination method. For example, a method of utilizing a fork boost value representing by what number of instructions the FORK instruction can be moved to the upstream with respect to the original conditional branching instruction for selection of the fork spot is disclosed on pages 2,049–2,050 of Document 4 mentioned hereinabove. In order to introduce the method, a discrimination step for discriminating whether or not the fork should be performed depending upon the fork boost value should be incorporated at the position immediately prior to Step 44 or step 76 of the processing of the instruction reordering section 23 in the first and second embodiments of the present invention.

The functions and the processes described above of the fork spot determination section 21, register allocation section 22, instruction reordering section 23, intermediate program outputting section 24 and profile information inputting section 25 of the parallelization apparatus 11 of the program conversion apparatus (compiler) 2 in the first and second embodiments are realized by a program executed on a computer. In this instance, the program conversion apparatus of the present invention can be carried out either by loading the program (of the execute form) into a main memory of the computer from a recording medium on which the program is recorded such as, for example, a CD-ROM, a DVD (digital versatile disk), a FD (floppy disk) a HDD (hard disk drive), a MT (magnetic tape), or a semiconductor memory so that the program is executed by the computer or by downloading the program onto a HDD or the like of the computer from a server or the like through a communication medium and installing the program into the computer so that the program is executed by the computer.

While preferred embodiments of the present invention have been described using specific terms, such description is for illustrative purposes only, and it is to be understood that changes and variations may be made without departing from the spirit or scope of the following claims.

What is claimed is:

1. A program conversion apparatus for converting a given source program into a program for a multi-thread processor including a plurality of program counters and a plurality of thread execution apparatus, said plurality of thread execution apparatus being operable to fetch, decode and execute a plurality of instructions of threads simultaneously in accordance with said plurality of program counters such that is possible to execute, after a thread is created, the thread in a control speculative mode wherein a change having had an effect on a register set can be cancelled later, and to execute the thread in a data-dependent speculative mode wherein, when, after a self thread loads a value from a memory location, a parent thread by which the self thread has been created stores a value into the same memory location, at least a processing result of the self thread after the load is abandoned and the processing is re-executed, said multi-thread processor having an instruction set with which it can be executed by a single machine instruction or a combination of several machine instructions for a thread being executed by any of said thread execution apparatus to create a new thread of the control speculative mode, to end, if a designated condition is satisfied, the self thread and clear the control speculative mode of a thread of the control speculative mode created by the self thread, to abandon the created thread of the control speculative mode, to give, when a thread created by the self thread performs load from a memory location of a designated address, an instruction in advance to temporarily block the operation, to clear the load temporary blocking instruction to the designated memory address, for the thread being executed by the thread execution apparatus to create a new thread of the data-dependent speculative mode and to clear the data-dependent speculative mode of the thread of the data-dependent speculative mode created by the self thread, said program conversion apparatus comprising:

a register allocation trial section for trying register allocation prior to parallelization to estimate a register allocation situation of variables and intermediate terms of an intermediate program;

a fork spot determination section for determining based on a result of the register allocation trial by said register allocation trial section whether or not a conditional branch portion of the intermediate program should be converted into a parallel code for which a thread creation instruction is used and determining a parallelization execution method with the parallel code;

an instruction reordering section for converting the conditional branch portion in the intermediate program into a parallel code for which the thread creation instruction is used based on a result of the determination by said fork spot determination section and referring to the result of the register allocation trial to insert an instruction for assuring a data-dependence relationship between threads through a memory into positions before and after the thread creation instruction and reorder the instructions before and after the thread creation instruction so that thread creation may be performed in an early stage; and a register allocation section for performing definite register allocation so that, regarding whether or not a physical register is allocated to the parallelized and reordered instruction sequence, the same allocation result as that upon the register allocating trial may be obtained.

2. The program conversion apparatus as claimed in claim 1, wherein said fork spot determination section investigates a data dependence relationship through a memory from a basic block in the intermediate program which is a processing object at present to each of basic blocks of branching destinations of a conditional branching instruction positioned at the tail end of the basic block, counts, for each of the branching destinations, an instruction step number, from the top of the branching destination basic block, of the instruction at the top one of memory reference instructions in the branching destination basic block which cause the data dependence, and selects that one of the branching destination basic blocks whose instruction step number is greater as a new thread to be executed parallelly.

3. The program conversion apparatus as claimed in claim 2, wherein said fork spot determination section determines the position of a data-dependent instruction through a memory in each branching destination basic block using a value obtained by accumulating estimated execution cycle numbers of instructions in place, of the instruction step number.

4. The program conversion apparatus as claimed in claim 1, wherein, upon conversion from a source program into a target program first, address coordination information for establishing coordination between the basic blocks of the intermediate program in said program conversion apparatus and machine language addresses of the target program to be outputted is outputted together with the target program, and a target program execution apparatus reads in the target program and the address coordination information and executes the target program and then outputs profile information including branch profile information between basic blocks upon the execution of the target program and data dependence information occurring through a memory between the basic blocks, whereafter, when said program conversion apparatus parallelizes the source program to convert the source program into a target program, said fork spot determination section refers to the profile information to preferentially select a branching destination basic block to which control flows in a high probability at a conditional branch and another branching destination basic block with which data dependence occurs in a low probability at a conditional branch as a new thread to be executed parallelly.

5. The program conversion apparatus as claimed in claim 4, wherein said fork spot determination section produces an instruction to cause a conditional branching destination basic block selected as an execution start point of the new thread to be executed parallelly to temporarily block, when the number of spots of different memory addresses which cause data dependence is smaller than a predetermined number based on a result of an analysis of data dependence through a memory in the intermediate program and a data dependence occurrence probability obtained from the profile information, load operation of the new thread from the memory addresses, and investigates, when the number of spots of different memory addresses which cause data dependence is equal to or greater than the predetermined number, whether or not the data dependence occurrence probability is lower than a predetermined probability and produces, if the probability is lower, an instruction to create a new thread in the data-dependent speculative mode and controls, if the probability is equal to or higher than the predetermined probability, so as to stop the parallelization conversion at the spot.

6. The program conversion apparatus as claimed in claim 4, wherein said fork spot determination section investigates a data dependence relationship through a memory from the basic block in the intermediate program currently which is a processing object at present to each of the branching destination basic blocks of the conditional branching instruction positioned at the tail end of the basic block and synthesizes the investigated data dependence relationship and the conditional branching probability obtained from the profile information, and if a result of the synthesis reveals that the branching probabilities regarding the branching destination basic blocks at the conditional branch do not have a difference greater than a predetermined amount and data dependence occurrence timings through a memory do not have a difference greater than a predetermined amount, said fork spot determination section determines so as not to parallelize the conditional branching portion.

7. A program conversion apparatus, comprising:
a syntax analysis section for analyzing the syntax of a source program to produce an intermediate program;
a parallelization section for performing optimization processing including parallelization for the intermediate program; and
a code generation section for producing a target program including an instruction code for a target processor apparatus from the intermediate program optimized by said parallelization section;
said parallelization section including an intermediate program inputting section for reading in the intermediate program and analyzing a control flow and a data flow, a register allocation section for trying to perform register allocation prior to parallelization to estimate a register allocation situation of variables and intermediate terms of the intermediate program and executing allocation of registers, a fork spot determination section for determining, based on a result of the trial of the register allocation, a spot of a conditional branch portion of the intermediate program to be converted into a parallel code for which a thread creation instruction is used, an instruction reordering section for performing reordering of instructions before and after the parallelization spot from information of the parallelization spot determined by said fork spot determination section, the data flow, and an intermediate program outputting section for outputting the instruction sequence for which the conversion including the parallelization has been completed in a format of the intermediate program again.

8. The program conversion apparatus as claimed in claim 7, wherein said parallelization section includes a profile information inputting section for receiving profile information outputted from the target processor apparatus as a result of execution of the target program and converting the profile information into information of an internal format, and said fork spot determination section determines, based on the result of the register allocation trial and the profile information, a spot of a conditional branch portion of the intermediate program to be converted into a parallel code it which the thread generation code is used and determines a parallelization execution method by the parallel code.

9. The program conversion apparatus as claimed in claim 7, wherein said instruction reordering section converts conditional branching portions in the intermediate program into a parallel code in which the thread creation instruction is used based on a result of the determination by said fork spot determination section, refers to the result of the register allocation trial to insert an instruction for assuring a data dependence relationship between threads through a memory into positions before and after the thread creation instruction and reorders the instructions before and after the thread creation instruction so that thread creation may be performed in an early stage.

10. The program conversion apparatus as claimed in claim 7, wherein said register allocation section performs definite register allocation so that, regarding whether or not a physical register is allocated to the parallelized and reordered instruction sequence, the same allocation result as that upon the register allocation trial may be obtained.

11. The program conversion apparatus as claimed in claim 7, wherein the target processor apparatus is a multi-thread processor which includes a plurality of program counters and a plurality of thread execution apparatus, said plurality of thread execution apparatus being operable to fetch, decode and execute a plurality of instructions of threads simultaneously in accordance with said plurality of program counters such that it is possible to execute, after a thread is created, the thread in a control speculative mode wherein a change having had an effect on a register set can be canceled later and to execute the thread in a data-dependent speculative mode wherein, when, after a self thread loads a value from a memory location, a parent thread by which the self thread has been created stores a value into the same memory location, at least a processing result of the self thread after the load is abandoned and the processing is re-executed said multi-thread processor having an instruction set with which it can be executed by a single machine instruction or a combination of several machine instructions for a thread being executed by any of said thread execution apparatus to create a new thread of the control speculative mode, to end, if a designated condition satisfied the self thread and clear the control speculative mode of a thread of the control speculative mode created by the self thread, to abandon the created thread of the control speculative mode, to give, when α thread created by the self thread performs load from a memory location of a designated address, an instruction in advance to temporarily block the operation, to clear the load temporary blocking instruction to the designated memory address, for the thread being executed by the thread execution apparatus to create a new thread of the data-dependent speculative mode and to clear the data-dependent speculative mode of the thread of the data-dependent speculative mode created by the self thread.

12. A program conversion apparatus for performing optimization processing including parallelization of an intermediate program obtained by a syntax analysis of a source program performed by a syntax analysis section so that the intermediate program may be suitable for a target processor apparatus, comprising:
   register allocation trial means for trying allocation of registers of the target processor apparatus on the intermediate program and obtaining register allocation information prior to actual allocation;
   means for calculating a distance of data dependence generated through a memory in the target processor apparatus for the intermediate program;
   means for determining a fork designation taking the distance of data dependence through a memory on the intermediate program into consideration and replacing a conditional branch with a thread creation instruction; and
   means for referring to a result of the register allocation trial to reorder the instructions before and after the thread creation instruction on the intermediate program.

13. The program conversion apparatus according to claim 12, wherein said means for replacing a conditional branch with a thread creation instruction includes:
   means for calculating a minimum value of distance of data dependence of intermediate terms and variables for each of the two branching destinations of the conditional branch; and
   means for comparing the two minimum values of the distance of data dependence determined for the two branches of the conditional branch, determining, when the two minimum values have a difference greater than or equal to a predetermined value, the branching direction of the branch which exhibits the higher minimum value of the distance of data dependence as a fork destination and selecting the conditional branch spot as a fork spot, and determining, when the two minimum values of the distance of data dependence do not have a difference equal to or greater than the predetermined value, that branching destination which has been a branching destination in the original intermediate program as a fork destination and selecting the conditional branch spot as a fork spot candidate.

14. The program conversion apparatus as claimed in claim 12, further comprising:
   means for receiving profile information outputted from a processor apparatus which executes the target program outputted from said program conversion apparatus and calculating a conditional branching probability and a data dependence occurrence frequency from the profile information; and
   means for determining a fork destination and a data dependence assurance system from the distance of data dependence, the conditional branch probability and the data dependence occurrence frequency, and the number of spots of different memory addresses which cause data dependence and replacing the conditional branch with the thread creation instruction.

15. A program conversion method for performing an optimization process including parallelization for an intermediate program outputted as a result of a syntax analysis on a program conversion apparatus which compiles a source program and outputs a target program for a target processing apparatus of the multi-thread type, comprising:

a register allocating trial step of trying register allocation prior to parallelization to estimate a register allocation situation of variables and intermediate terms of the intermediate program;
   a fork spot determination step of determining based on a result of the register allocation trial whether or not a conditional branch portion of the intermediate program should be converted into a parallel code for which a thread creation instruction is used or performing determination of whether or not the conditional branch portion should be converted into a parallel code and, when such conversion should be performed, determination of a parallelization execution method;
   an instruction reordering step of converting the conditional branch portion in the intermediate program into a parallel code for which the thread creation instruction is used based on a result of the determination by the fork spot determination step and referring to the result of the register allocation trial to insert an instruction for assuring a data-dependence relationship between threads through a memory into positions before and after the thread creation instruction and reorder the instructions before and after the thread creation instruction so that thread creation may be performed in an early stage; and
   a register allocation step of performing definite register allocation so that the same allocation result as that upon the register allocation trial may be obtained for the parallelized and reordered instruction sequence.

16. The program conversion method as claimed in claim 15, wherein the fork spot determination step means calculates a minimum value of distance of data dependence of intermediate terms and variables or each of the two branching destinations of the conditional branch, compares the two minimum values of the distance of data dependence determined for the two branches of the conditional branch, determines, when the two minimum values have a difference equal to or greater than a predetermined value, the branching direction of the branch which exhibits the higher minimum value of the distance of data dependence a fork destination and selects the conditional branch spot as a fork spot, and determines, when the two minimum values of the distance of data dependence do not have a difference equal to or greater than the predetermined value, that branching destination on which has been a branching destination in the original intermediate program as a fork destination and selects the conditional branch spot as a fork spot candidate.

17. The program conversion method as claimed in claim 15, wherein the fork spot determination step investigates a data dependence relationship through a memory from a basic block having no branch and no confluence from within the intermediate program which is a processing object at present to each of basic blocks of branching destinations of a conditional branching instruction positioned at the tall end of the basic block, counts, for each of the branching destinations, an instruction step number, from the top of the branching destination basic block, of the instruction at the top one of memory reference instructions in the branching destination basic block which cause the data dependence, and selects that one of the branching destination basic blocks whose instruction step number is greater as a new thread to be executed parallelly.

18. The program conversion method as claimed in claim 17, wherein the fork spot determination step determines the position of a data-dependent instruction through a memory in each branching destination basic block using a value obtained by accumulating estimated execution cycle numbers of instructions in place of the instruction step number.

19. The program conversion method as claimed in claim 15, wherein, upon conversion from a source program into a target program first by said program conversion apparatus, address coordination information for establishing coordination between the basic blocks of the intermediate program and machine language addresses of the target program to be outputted is outputted together with the target program, and a processor apparatus which is to execute the object program reads in the target program and the address coordination information and executes the target program and then outputs profile information including branch profile information between basic blocks upon the execution of the target program and data dependence information occurring through a memory between the basic blocks, whereafter, when said program conversion apparatus parallelizes the source program to convert the source program into a target program, the fork spot determination step refers to the profile information to preferentially select a branching destination basic block to which control flows in a high probability at a conditional branch and another branching destination basic block with which data dependence occurs in a low probability at a conditional branch as a new thread to be executed parallelly.

20. The program conversion method as claimed in claim 19, wherein the fork spot determination step produces an instruction to cause a conditional branching destination basic block selected as an execution start point of the new thread to be executed parallelly to temporarily block, when the number of spots of different memory addresses which cause data dependence is smaller than a predetermined number based on a result of an analysis of data dependence through a memory in the intermediate program and a data dependence occurrence probability obtained from the profile information, load operation of the new thread from the memory addresses, and investigates, when the number of spots of different memory addresses which cause data dependence is equal to or greater than the predetermined number, whether or not the data dependence occurrence probability is lower than a predetermined probability and produces, if the probability is lower, an instruction to create a new thread in the data-dependent speculative mode and controls, if the probability is equal to or higher than the predetermined probability, so as to stop the parallelization conversion at the spot.

21. The program conversion apparatus as claimed in claim 19, wherein the fork spot determination step investigates a data dependence relationship through a memory from the basic block in the intermediate program currently which is a processing object at present to each of the branching destination basic blocks of the conditional branching instruction positioned at the tail end of the basic block and synthesizes the investigated data dependence relationship and the conditional branching probability obtained from the profile information, and if a result of the synthesis reveals that the branching probabilities regarding the branching destination basic blocks at the conditional branch do not have a difference greater than a predetermined amount and data dependence occurrence timings through a memory do not have a difference greater than a predetermined amount, said fork spot determination section determines so as not to parallelize the conditional branching portion.

22. The program conversion method as claimed in claim 15, wherein the fork spot determination step includes the steps of:

discriminating whether or not the conditional branching instruction corresponds to a return branch of a loop structure in the intermediate program;

determining, when the conditional branching instruction corresponds to a loop return branch, the direction of the return branch, which is a loop continuing direction, as a fork destination and selecting the conditional branch spot as a fork spot;

calculating, when the conditional branching instruction is not a loop return branch, a minimum value of the distance of data dependence of intermediate terms/variables for each of the two branch destinations of the conditional branch;

comparing the two minimum values of the distance of data dependence determined with regard to the two branches of the conditional branch with each other to discriminate whether or not the two minimum values have a difference greater than a predetermined value; and determining, when the two minimum values of the distance of data dependence have a difference greater than the predetermined value, the branch which exhibits a larger one of the minimum values of the distance of data dependence as a fork destination and selecting the conditional branching spot as a fork spot;

determining, when the two minimum values of the distance of data dependence do not have a difference greater than the predetermined value, that one of the branches which has been a branch destination in the original intermediate program as a fork destination and selecting the conditional branching spot as a fork candidate.

23. The program conversion method as claimed in claim 22, wherein the distance of data dependence is the number of steps in the intermediate program which represents at what distance from the top of a basic program of the branching destination the memory reference instruction is positioned with regard to each of the intermediate terms and variables which are defined in the basic block which is a processing object at present and may possibly be referred to in the branching destination and besides are estimated to be arranged on the memory.

24. The program conversion method as claimed in claim 22, wherein, upon the determination of the distance of data dependence, the number of cycles estimated to be required when pertaining instructions are executed on a processor of an object architecture.

25. The program conversion method as claimed in claim 15, wherein the instruction reordering step includes:

a first step of investigating an allocation situation of registers with regard to whether each of intermediate terms and variables in the intermediate program is coordinated with a register or a memory;

a second step of replacing a branching instruction positioned at the tail end of a basic instruction which is a processing object at present with a control speculation mode FORK instruction while the fork destination which is an operand of the control speculation mode FORK instruction is determined as the fork destination selected by the fork spot determination step;

a third step of moving a branching condition expression positioned immediately prior to the control speculation mode FORK instruction in the intermediate instruction to the position immediately next to the control speculation mode FORK instruction and inserting to be tail end of the basic block, which is the destination of the movement of the branching condition expression, an instruction sequence for ending, when the branching condition is satisfied, the self thread and placing a child thread into a settlement mode which is a non-control speculation mode, abandoning, when the branching condition is not satisfied, the child thread and keeping the self thread to continue execution of a succeeding instruction train;

a fourth step of moving each of instruction statements which are on the upstream side with respect to the control speculation mode FORK instruction in the basic block being a processing object at present and are to be substituted into intermediate terms and variables coordinated with a memory to a position on the downstream side with respect to the control speculation FORK instruction and inserting a BLOCK setting instruction to the position immediately prior to the control speculation mode FORK instruction while inserting a BLOCK clear instruction to the position immediately next to the movement destination of the substitute statement; and a fifth step of issuing an instruction to allocate the registers in accordance with the register allocation situation assumed by the fork conversion processing in the second step.

26. The program conversion method as claimed in claim 15, wherein the fork spot determination step includes:

a first step of discriminating whether or not the conditional branching instruction corresponds to a return branch of a loop structure in the intermediate program;

a second step of provisionally determining, when the conditional branching instruction corresponds to a return branch of a loop structure, the direction of the return branch as a fork destination;

a third step of calculating, based on the received profile information, a probability with which a taken side of the conditional branching instruction is selected and another probability with which a fall-through side of the conditional branching instruction is selected;

a fourth step of discriminating whether or not the two calculated probabilities of the branches have a difference greater than a predetermined value;

a fifth step of provisionally determining, if the difference between the two probabilities of the branches is greater than the predetermined value, the branch which exhibits the higher probability as a fork destination;

a sixth step of calculating a minimum value of the distance of data dependence for each of the two branching destinations of the conditional branch;

a seventh step of comparing the two minimum values of the distance of data dependence determined with regard to the two branches of the conditional branch with each other to discriminate whether or not the two minimum values have a difference greater than a predetermined value;

an eighth step of determining, when the two minimum values of the distance of data dependence have a difference greater than the predetermined value or no data dependence is found that one of the branches which exhibits a higher one of the minimum values of the distance of data dependence as a fork destination;

a ninth step of calculating a minimum value of the distance of data dependence for the fork destination provisionally determined in the second step or the fifth step and discriminating whether or not the minimum value of the distance of data dependence of the provisionally determined fork destination is equal to or higher than a predetermined value;

a tenth step of settling, if the minimum value of the distance of data dependence of the provisionally determined fork destination is equal to or higher than a predetermined value or no data dependence through a memory is found, the fork destination provisionally determined in the second step or the fifth step as a formal fork destination;

an eleventh step of excepting, when it is determined that the minimum value of distance of data dependence is lower than the predetermined value, the basic block from a fork spot;

a twelfth step of calculating a data dependence occurrence frequency from the received profile information;

a thirteenth step of discriminating whether or not the data dependence occurrence frequency is equal to or higher than a fixed level, counting, when the data dependence occurrence frequency is lower than the fixed level, the number of intermediate terms/variables on the memory which may possibly cause data dependence from the basic block of the fork source to the basic block of the fork destination in the intermediate program, discriminating whether or not the count value representing a data-dependent spot number is equal to or higher than a fixed level, determining that a fork according the DSP system is used if the data-dependent spot number is equal to or higher than the fixed level and determining that a fork according to the BLOCK system is used if the data-dependent spot number is lower than the fixed level, and providing information of the fork to the FORK instruction in the intermediate program; and a fourteenth step of counting, when the data dependence occurrence frequency is equal to or higher than the fixed level, the number of data-dependent variables on the memory and determining that a fork according to the BLOCK system is used if the counted number is smaller than a fixed level and removing the basic block from a fork candidate if the counted number is equal to or greater than the fixed level.

27. The program conversion method as claimed in claim 15, wherein the instruction reordering step includes:

a first step of investigating an allocation situation of registers with regard to whether each of intermediate terms and variables in the intermediate program is coordinated with a register or a memory;

a second step of replacing a branching instruction positioned at the tail end of a basic instruction which is a processing object at present with a control speculation mode FORK instruction while the fork destination which is an operand of the control speculation made FORK instruction is determined as the fork destination selected by the fork spot determination step;

a third step of moving a branching condition expression positioned immediately prior to the control speculation FORK instruction in the intermediate instructional to the position immediately next to the control speculation FORK instruction and inserting to the tail end of the basic block, which is the destination of the movement of the branching condition expression, an instruction sequence for ending, when the branching condition is satisfied, the self thread and placing a child thread into a settlement mode which is a non-control speculation mode, and abandoning, when the branching condition is not satisfied, the child thread and keeping the self thread to continue execution or a succeeding instruction train;

a fourth step of checking whether a fork data assurance system of the fork spot determined by the fork spot determination step is a BLOCK system or a DSP system;

a fifth step of moving, when the fork data assurance system is the BLOCK system, a memory store statement prior to the fork to a position after the fork, inserting necessary BLOCK setting and BLOCK clear instructions, inspecting, upon the movement, a data dependence relationship and moving only those instructions a change of whose instruction execution order does not change a result of arithmetic operation;

a sixth step of modifying, when the fork data assurance system is the DSP system, the FORK instruction produced by replacement in the second step so that a substitute statement into an intermediate term coordinated with a memory is moved to a position next to the FORK instruction to perform the fork in a data-dependent speculation mode; and a seventh step of issuing an instruction to allocate the registers in accordance with the register allocation situation assumed by the fork conversion process in the second step.

28. A recording medium on which a program for causing a computer to perform an optimization process including parallelization for an intermediate program outputted as a result of a syntax analysis on a compiler which compiles a source program and produces and outputs a target program for a multi-thread processor apparatus is recorded, the optimization process including:

a register allocation trial process of trying register allocation prior to parallelization to estimate a register allocation situation of variables and intermediate terms of the intermediate program;

a fork spot determination process of determining based on a result of the register allocation trial whether or not a conditional branch portion of the intermediate program should be converted into a parallel code for which a thread creation instruction is used or performing determination of whether or not the conditional branch portion should be converted into a parallel code and, when such conversion should be performed, determination of a parallelization execution method;

an instruction reordering process of converting the conditional branch portion in the intermediate program into a parallel code for which the thread creation instruction is used based on a result of the determination by the fork spot determination step and referring to the result of the register allocation trial to insert an instruction for assuring a data-dependent relationship between threads through a memory into positions before and after the thread creation instruction and reorder the instructions before and after the thread creation instruction so that thread creation may be performed in an early stage; and a register allocation process of performing definite register allocation so that the same allocation result as that upon the register allocation trial with regard to whether a physical register is allocated may be obtained for the parallelized and reordered instruction sequence.

29. The recording medium as claimed in claim 28, wherein the fork spot determination process investigates a data dependence relationship through a memory from a basic block in the intermediate program which is a processing object at present to each of basic blocks of branching destinations of a conditional branching instruction positioned at the tail end of the basic block, counts, for each of the branching destinations, an instruction step number from the top of the branching destination basic block, of the instruction at the top one of memory reference instructions in the branching destination basic block which cause the data dependence, and selects that one of the branching destination basic blocks whose instruction step number is greater as a new thread to be executed parallelly.

30. The medium as claimed in claim 28, wherein the fork spot determination process determines the position of a data-dependent instruction through a memory in each branching destination basic block using a value obtained by accumulating estimated execution cycle numbers of instructions in place of the instruction process number.

31. The medium as claimed in claim 28, wherein, upon conversion from a source program into a target program first by said compiler, address coordination information for establishing coordination between the basic blocks of the intermediate program and machine language addresses of the target program to be outputted is outputted together with the target program, and a processor apparatus which is to execute the object program reads in the target program and the address coordination information and executes the target program and then outputs profile information including branch profile information between basic blocks upon the execution of the target program and data dependence information occurring through a memory between the basic blocks, whereafter when said compiler parallelizes the source program to convert the source program into a target program, the fork spot determination process refers to the profile information to preferentially select a branching destination basic block to which control flows in a high probability at a conditional branch and another branching destination basic block with which data dependence occurs in a low probability at a conditional branch as a new thread to be executed parallelly.

32. The medium as claimed in claim 31, wherein the fork spot determination process produces an instruction to cause a conditional branching destination basic block selected as an execution start point of the new thread to be executed parallelly to temporarily block, when the number of spots of different memory addresses which cause data dependence is smaller than a predetermined number based on a result of an analysis of data dependence through a memory in the intermediate program and a data dependence occurrence probability obtained from the profile information, load operation of the new thread from the memory addresses, and investigates, when the number of spots of different memory addresses which cause data dependence is equal to or greater than the predetermined number, whether or not the data dependence occurrence probability is lower than a predetermined probability and produces, if the probability is lower, an instruction to create a new thread in the data-dependent speculative mode and controls, if the probability is equal to or higher than the predetermined probability, so as to stop the parallelization conversion at the spot.

33. The medium as claimed in claimed 31, wherein the fork spot determination process investigates a data dependence relationship through a memory from the basic block in the intermediate program currently which is a processing object at present to each of the branching destination basic blocks of the conditional branching instruction positioned at the tail end of the basic block and synthesizes the investigated data dependence relationship and the conditional branching probability obtained from the profile information, and if a result of the synthesis reveals that the branching probabilities regarding the branching destination basic blocks at the conditional branch do not have a difference greater than a predetermined amount and data dependence occurrence timings through a memory do not have a difference greater than a predetermined amount, said fork spot determination section determines so as not to parallelize the conditional branching portion.

34. A program conversion apparatus for converting a given source program into a program for a multi-thread processor including a plurality of program counters and a plurality of thread execution apparatus, said plurality of thread execution apparatus being operable to fetch, decode and execute a plurality of instructions of threads simultaneously in accordance with said plurality of program counters such that it is possible to execute, after a thread is created, the thread in a control speculative mode wherein a change having had an effect on a register set can be cancelled later and to execute the thread in a data-dependent speculative mode wherein, when, after a self thread loads a value from a memory location, a parent thread by which the self thread has been created stores a value into the same memory location, at least a processing result of the self thread after the load is abandoned and the processing is re-executed, said multi-thread processor having an instruction set with which it can be executed by a single machine instruction or a combination of several machine instructions for a thread being executed by any of said thread execution apparatus to give, when a thread created by the self thread performs load from a memory location of a designated address, an instruction in advance to temporarily block the operation, to clear the load temporary blocking instruction to the designated memory address, for the thread being executed by the thread execution apparatus to create a new thread of the data-dependent speculative mode and to clear the data-dependent speculative mode of the thread of the data-dependent speculative mode created by the self thread, said program conversion apparatus comprising:

a fork spot determination section for determining whether or not a conditional branch portion of the intermediate program should be converted into a parallel code for which a thread creation instruction is used and determining a parallelization execution method with the parallel code;

said fork spot determination section including calculation means for calculating at least two or more distances of data dependence and means for determining the branching direction of that one of the distances of data dependence which exhibits a higher minimum value as a fork destination and selecting the branch spot as a fork spot.

* * * * *